United States Patent
Haneda et al.

(10) Patent No.: US 10,587,809 B2
(45) Date of Patent: Mar. 10, 2020

(54) CONTINUOUS SHOOTING DEVICE, CONTINUOUS SHOOTING METHOD AND CONTINUOUS SHOOTING CONTROL METHOD USING PRELIMINARY AND CALCULATED PARAMETER VALUES

(71) Applicant: Olympus Corporation, Hachioji-shi, Tokyo (JP)

(72) Inventors: Kazuhiro Haneda, Hachioji (JP); Yoshiyuki Fukuya, Sagamihara (JP); Kazuo Kanda, Higashiyamato (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 90 days.

(21) Appl. No.: 15/893,504

(22) Filed: Feb. 9, 2018

(65) Prior Publication Data
US 2018/0262686 A1  Sep. 13, 2018

(30) Foreign Application Priority Data
Mar. 7, 2017  (JP) .................................. 2017-042593

(51) Int. Cl.
*H04N 5/262* (2006.01)
*H04N 5/232* (2006.01)

(52) U.S. Cl.
CPC ..... *H04N 5/23267* (2013.01); *H04N 5/23216* (2013.01); *H04N 5/23222* (2013.01); *H04N 5/23293* (2013.01)

(58) Field of Classification Search
CPC ................................................ H04N 5/23225
See application file for complete search history.

(56) References Cited

U.S. PATENT DOCUMENTS

| | | | |
|---|---|---|---|
| 9,769,378 B2 * | 9/2017 | Shibuno | H04N 5/23222 |
| 9,787,891 B2 * | 10/2017 | Kamiya | G03B 13/16 |
| 2011/0134284 A1 * | 6/2011 | Kuriyama | G02B 7/102 348/240.3 |
| 2011/0141334 A1 * | 6/2011 | Kuriyama | G02B 7/36 348/333.11 |

FOREIGN PATENT DOCUMENTS

JP  2013-183189  9/2013

* cited by examiner

*Primary Examiner* — Gary C Vieaux
(74) *Attorney, Agent, or Firm* — John C. Pokotylo; Pokotylo Patent Services

(57) ABSTRACT

A shooting device, comprising: an operation member for setting parameters, and a controller having a parameter preliminary setting section and a parameter calculation section for each condition, wherein the parameter preliminary setting section, before continuous shooting comprised of a series of a plurality of frames, performs preliminary parameter setting as a result of operation of the operation member for at least one point of shooting predetermined positions of the plurality of frames, and the parameter calculation section for each condition calculates parameter at the time of shooting the plurality of frames in accordance with the parameters that have been set in the parameter preliminary setting section.

17 Claims, 11 Drawing Sheets

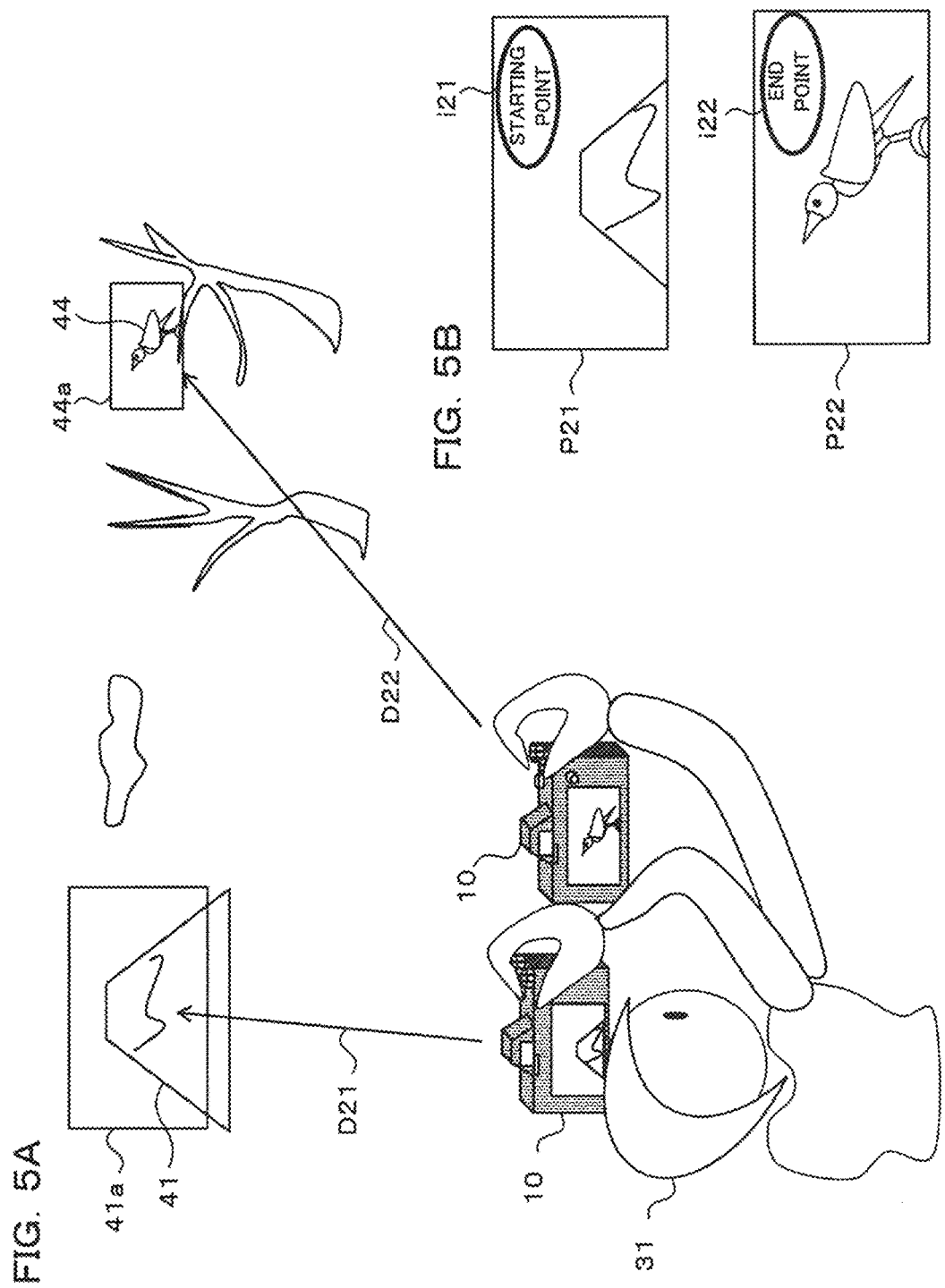

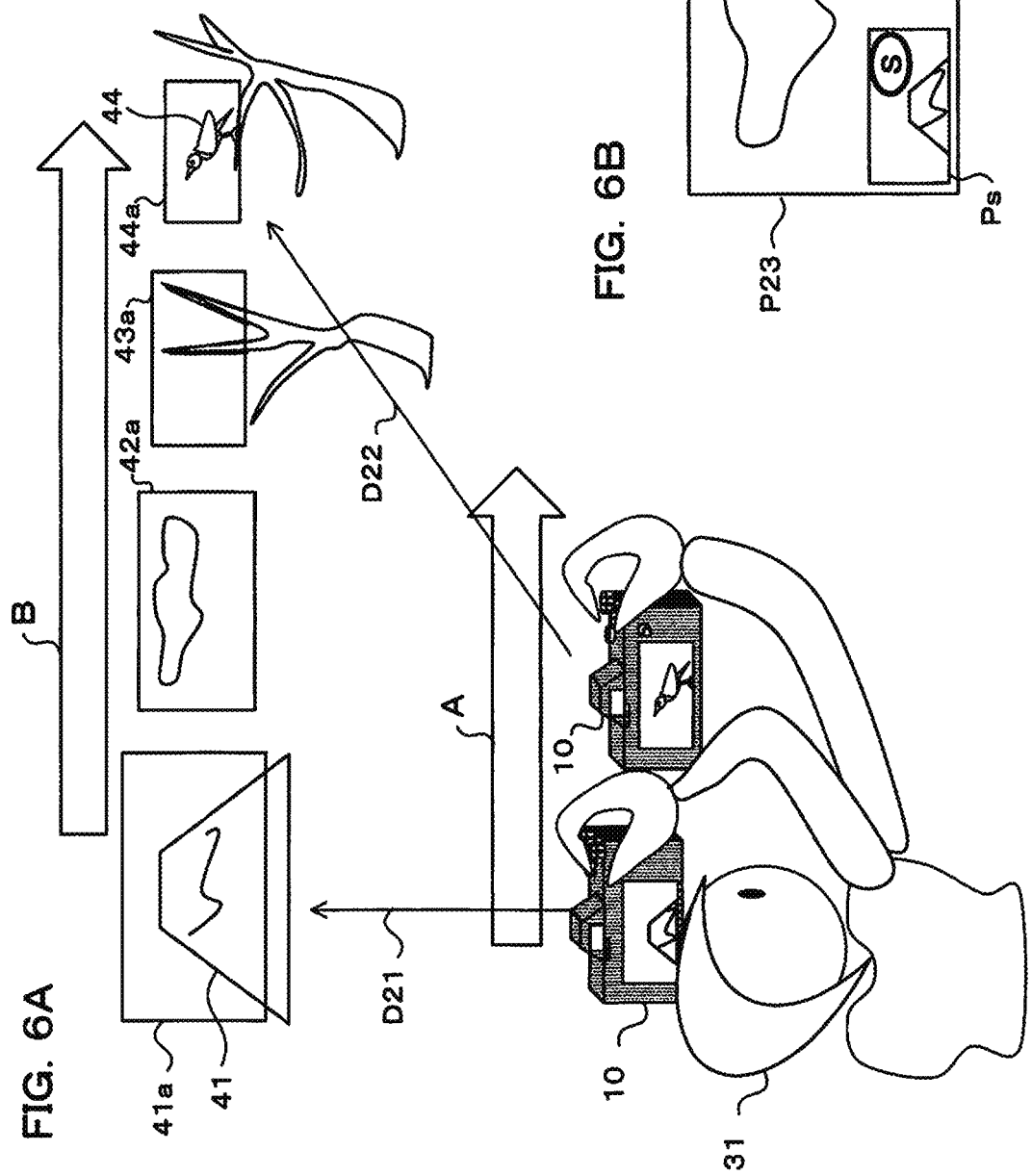

CONTINUOUS SHOOTING DEVICE, CONTINUOUS SHOOTING METHOD AND CONTINUOUS SHOOTING CONTROL METHOD USING PRELIMINARY AND CALCULATED PARAMETER VALUES

CROSS-REFERENCE TO RELATED APPLICATIONS

Benefit is claimed, under 35 U.S.C. § 119, to the filing date of prior Japanese Patent Application No. 2017-042593 filed on Mar. 7, 2017. This application is expressly incorporated herein by reference. The scope of the present invention is not limited to any requirements of the specific embodiments described in the application.

BACKGROUND OF THE INVENTION

1. Field of the Invention

The present invention is technology relating to movie shooting. The present invention relates to a shooting device, shooting method and shooting control method in which, before commencement of movie shooting, a rehearsal for shooting is performed to conveniently set parameters for shooting, and during movie shooting control can be performed in accordance with parameters that have been set at the time of the rehearsal for shooting.

2. Description of the Related Art

A movie in which featureless images continue lacks interest, and so at the time of shooting a movie, shooting may be performed with the photographer moving shooting direction and attitude etc., such as panning, tilting, while changing parameters for shooting, in order to produce variation on the screen (parameters such as, for example, focal length, focus position, exposure control value, white balance etc.). On the other hand, variation in images at the time of movie shooting causes unpleasantness to the viewer if the variation is not smooth. It is therefore desirable to obtain a movie in which screen transitions for parameters and/or composition etc. vary smoothly, even under such conditions. For example, in Japanese patent laid open number 2013-183189 (hereafter referred to as "patent publication 1") there is proposed a shooting device in which images very smoothly as a result of reducing camera shake at the time of a panning operation.

In the shooting device that has been proposed in patent publication 1, the effect of handshake has been assumed, but it is not possible to shoot a movie such that up to change in composition, field of view and parameters is performed smoothly, and it is possible to perform various representation.

SUMMARY OF THE INVENTION

The present invention provides a shooting device and shooting method that can simply perform transitions for shooting control at the time of movie shooting.

A shooting device of a first aspect of the present invention comprises an operation member for setting parameters, and a controller having a parameter preliminary setting section and a parameter calculation section for each condition, wherein the parameter preliminary setting section, prior to continuous shooting comprised of a series of a plurality of frames, performs preliminary parameter setting as a result of operation of the operation member for at least one of shooting predetermined positions of the plurality of frames, and the parameter calculation section for each condition calculates parameters at the time of shooting the plurality of frames in accordance with the parameters that have been set in the parameter preliminary setting section.

A shooting method of a second aspect of the present invention comprises, before continuous shooting comprised of a series of a plurality of frames, carrying out suitable preliminary parameter setting for at least one point of shooting predetermined positions of the plurality of frames, calculating respective parameters at the time of shooting the plurality of frames in accordance with results of the parameter preliminary setting, determining if conditions are satisfied, and carrying out shooting adopting the parameters that have been calculated.

A shooting control method of a third aspect of the present invention comprises, acquiring shooting parameters for shooting predetermined positions of specified frames of a movie as parameter preliminary setting data, and calculating parameters at the time of shooting, for at least one shooting position of specified frames of the movie, based on the parameter preliminary setting data.

BRIEF DESCRIPTION OF THE DRAWINGS

FIG. 5A and FIG. 5B are drawings for describing prior setting in the camera of the second embodiment of the present invention.

FIG. 6A and FIG. 6B are drawings for explaining a usage method at the time of movie shooting, with the camera of the second embodiment of the present invention.

DETAILED DESCRIPTION OF THE PREFERRED EMBODIMENTS

An example where a digital camera (hereafter simply called "camera") is adopted as a preferred embodiment of the present invention will be described in the following. This digital camera has an image sensor that converts a subject image to image data, and the subject image is subjected to live view display on a display section arranged on the rear surface of the camera body or in an electronic viewfinder, based on this converted image data. A photographer determines composition and photo opportunity by looking at the live view display. If the photographer operates a movie button, storage of movie data is commenced, and if the movie button is operated again storage of movie data is completed. Image data that has been stored in the storage medium can be played back and displayed on the display section if playback mode is selected.

Figure 4A:
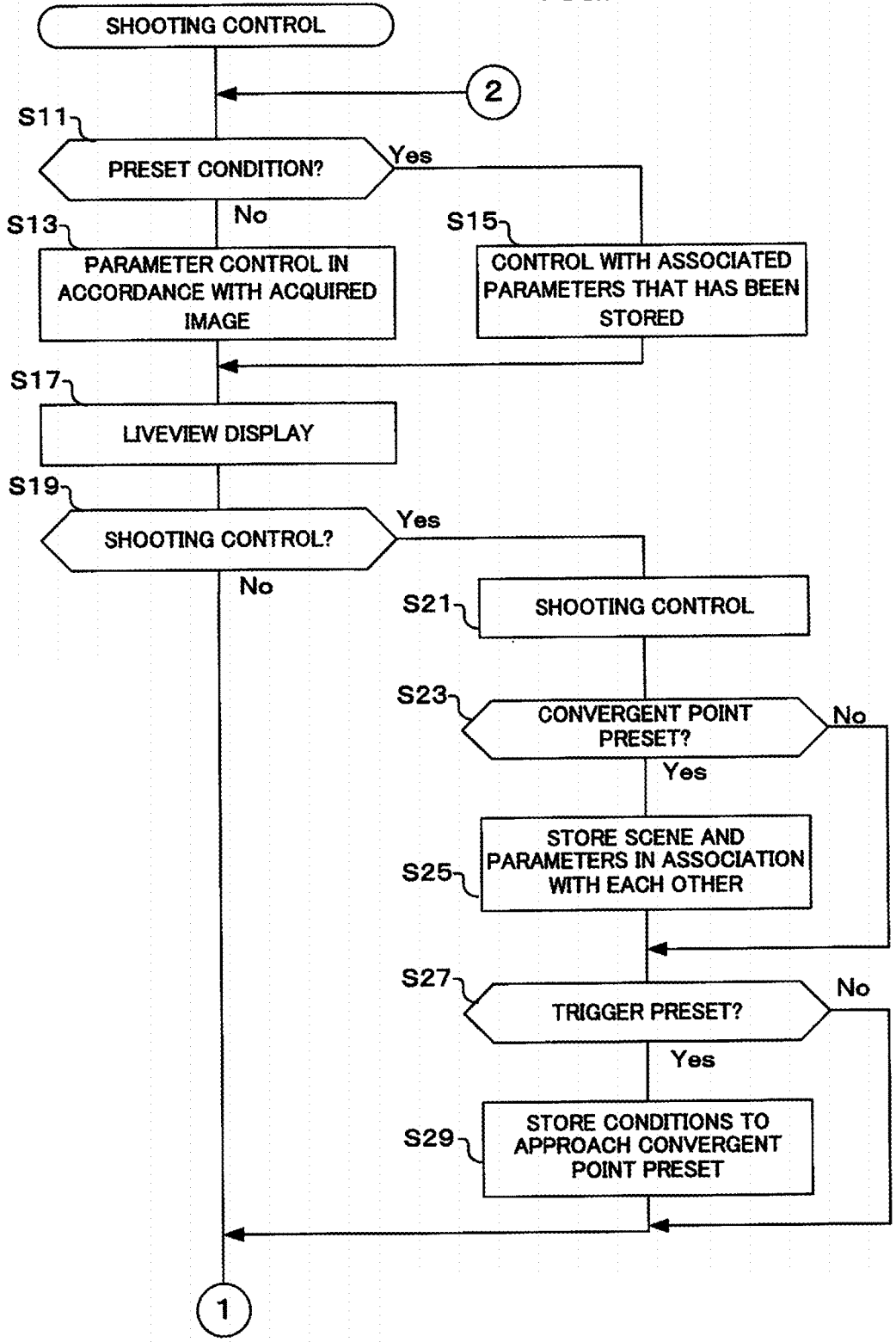
FIG. 4A and FIG. 4B are flowcharts showing shooting control of the camera of the first embodiment of the present invention.
Figure 9A:
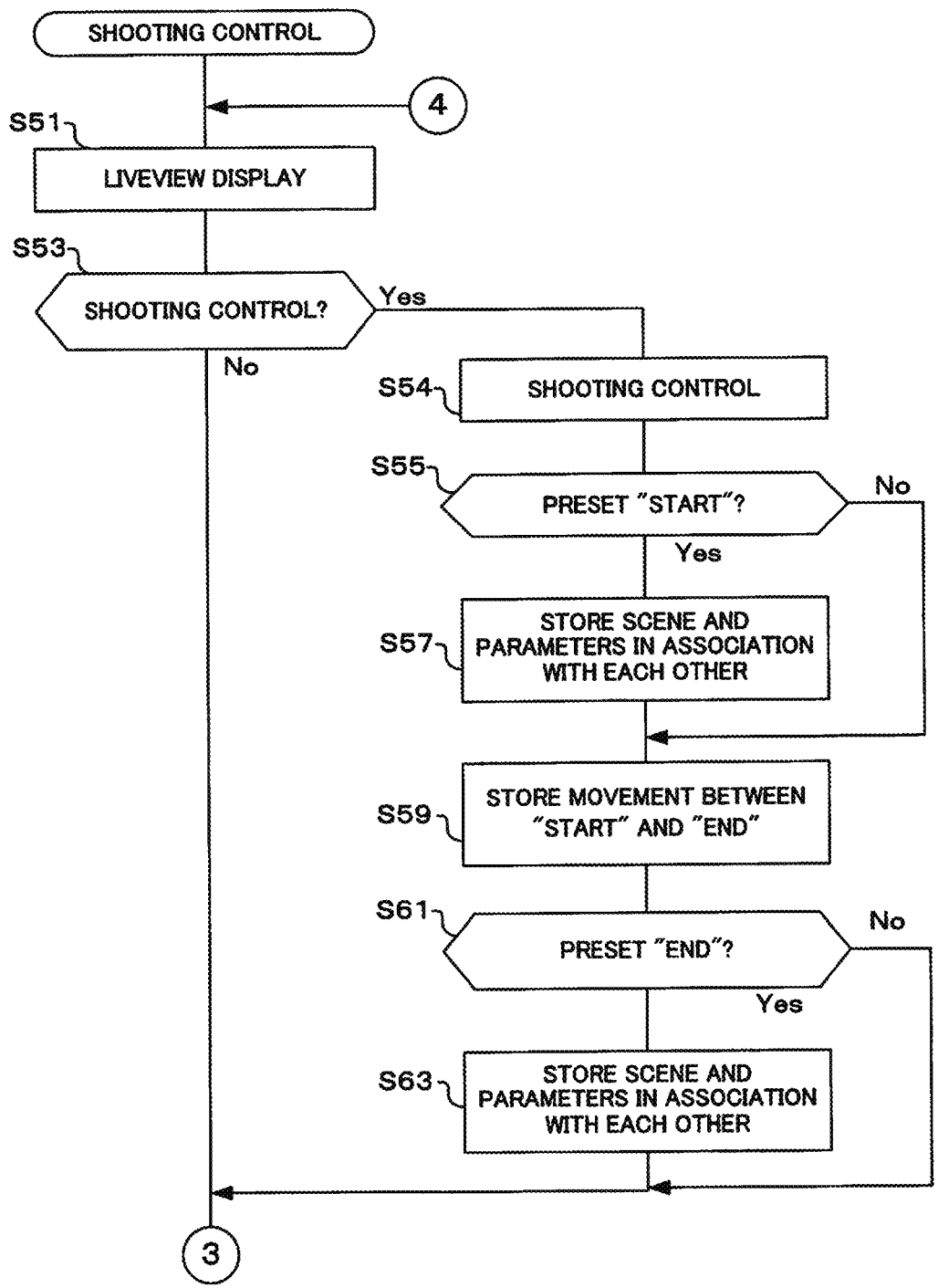
FIG. 9A and FIG. 9B are flowcharts showing shooting control of the camera of the second embodiment of the present invention.

Also, at the time of shooting by changing shooting direction, such as panning shooting etc., it is possible to set parameters in advance (for example, focal length, focus position, exposure control value, white balance etc.) for shooting predetermined positions etc., before movie shooting of a performance (for example, S25 and S29 in FIG. 4A, S57 and S63 in FIG. 9A etc.). At the time of actual shooting, if a designated shooting position is reached then shooting is performed in accordance with parameters that have been previously set (for example, S37 in FIG. 4B, S77 and S83 in FIG. 9B). Prior setting (preset) of parameters in this way can be performed in combination with a shooting dry run before shooting. With this shooting dry run it is possible for the user to grasp in advance images and responses at the time of shooting. The user can also confirm shooting screens in this dry run, can confirm the effect of settings, such as parameters, and can confirm time and effort required for shooting, and can also anticipate eventualities that are likely to actually occur. Further, by carrying out this presetting of parameters, it is possible, besides dealing with inconveniences that occur without the user realizing, such as camera shake, to perform confirmation such as will operations that are performed consciously have the assumed effect, or contrarily have any possibility of causing.

Figure 1:
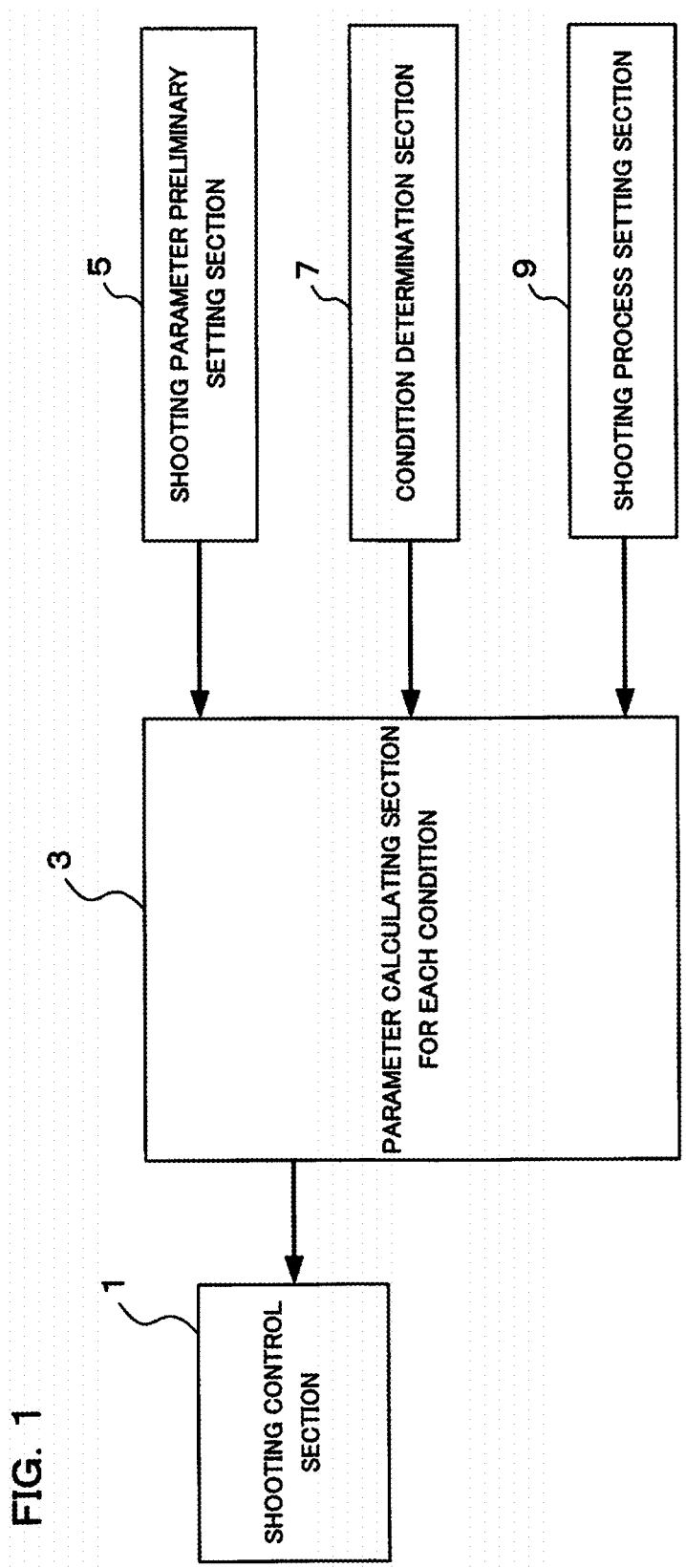
FIG. 1 is a block diagram showing the schematic structure of a camera relating to a first embodiment of the present invention.

FIG. 1 is a block diagram showing an outline of the camera of a first embodiment. This camera has a shooting control section 1, a parameter calculation section for each condition 3, a shooting parameter preliminary setting section 5, a condition determination section 7, and a shooting process setting section 9.

The shooting parameter preliminary setting section 5 is a setting section for the user to previously set parameters, before carrying out continuous shooting comprising a series of a plurality of frames, while sequentially changing shooting direction, such as panning shooting. A position at which a parameter is set using the shooting parameter settings section 5 is at least one location of a start point, an endpoint, or a shooting predetermined position between the start point and end point. Also, parameters that have been set are, for example, focal length, focus position, exposure control value, white balance etc. The user can easily confirm change in subject situation at the time of movie shooting of a performance utilizing the fact that parameters are previously set during a rehearsal before shooting of the performance, and the user can dedicate themselves to framing. This is because during movie shooting of a performance, parameters etc. can be switched automatically in accordance with a sequence that has been set in advance.

The shooting parameter preliminary setting section 5 has operation members such as a power switch, release button, movie button, cross-shaped button, OK button, operation dial, and/or operation switch etc. There may also be a touch panel or the like as an operation member. The shooting parameter preliminary setting section 5 functions as operation members for setting parameters. The shooting parameter preliminary setting section 5 functions as a parameter preliminary setting section that, before continuous shooting comprising a series of a plurality of frames, performs corresponding preliminary parameter setting for at least one point of any of shooting predetermined positions of the plurality of frames (refer, for example, to S25 in FIG. 4A, and S57 and S63 in FIG. 9A). The parameter preliminary setting section performs preliminary parameter setting at convergence point preset positions (refer, for example, to S25 in FIG. 4A). Also, the parameter preliminary setting section is capable of setting preliminary parameters at a plurality of shooting positions (refer, for example, to S57 and S63 in FIG. 9A).

The parameter preliminary setting section performs preliminary parameter setting of shooting positions for start point and end point (refer, for example, to S57 and S63 in FIG. 9a). The parameter preliminary setting section stores at least one among focus position, focal length, and exposure control value in association with a shooting predetermined position (refer, for example, to the shooting parameter preliminary setting section 17a in FIG. 2).

The condition determination section 7 determines whether or not the camera is at a shooting predetermined position that has been previously set by the shooting parameter preliminary setting section 5. Determination as to whether or not the camera is at a shooting predetermined position may be determination as to whether or not the camera is at a shooting predetermined position based on output of a sensor that detects camera movement, such as a Gyro or acceleration sensor provided in the camera. Besides this, determination may be based on output of various sensors such as a direction sensor, inclination sensor or GPS etc. Determination may also be by carrying out image recognition, based on image data from the image sensor. Further, if it is a case where the camera is moving at a constant speed etc., determination may be based on passage of time. Determination results of the condition determination section 7 are output to the parameter calculation section for each condition 3. The condition determination section 7 functions as a condition determination section that determines that the camera is at a shooting predetermined position.

Since the condition determination section 7 is provided and if the camera is at a shooting predetermined position is determined, if the camera reaches a shooting predetermined position it is possible to switch to parameters that have been preliminarily set. This means that even if the user themselves determines change in a condition, such as shooting position, and does not switch parameters etc. while performing movie shooting, it is possible for the camera to determine change in a condition that has arisen during movie shooting, and to perform shooting by switching to parameters that have been preliminarily set.

With this embodiment, the camera stores relationships between captured scenes and parameters. Start point and endpoint of shooting are determined, and transitioning of parameters from the start point to the end point may be performed so as to achieve a smooth natural appearance. However, since there are also cases where various changes arise during shooting of a movie (for example, although the start point and the end point are dark, the middle of the movie is bright, etc.), natural parameter change can be performed taking into consideration this type of change in situation also. For example in a case where only a middle part of the movie is bright, shooting may be performed with exposure control such that there is glare on the screen as a transient effect, without following all individual changes. On the other hand, in a case where it is desired to follow this change in brightness, shooting predetermined positions for this change in situation may be preset.

For convenience of description, an example has been given for start point and end point, but rehearsal shooting may also be performed such that shooting commences without a start point being set, and only conditions for end point are determined. In this case, condition setting is only performed for the end point. In a case where the user selection is not only for a start point and an end point, but also between these two points, information indicating from which shooting predetermined position parameters will be changed may be included.

The shooting process setting section 9 sets shooting operations for other than shooting predetermined positions that have been set by the shooting parameter preliminary setting section 5. Parameters for shooting predetermined positions and child positions are set by the shooting parameter preliminary setting section 5, but this shooting process setting section 9 set shooting operations for other than shooting predetermined positions, that have not been set by the shooting parameter preliminary setting section 5. For example, movement of the camera from the start point to the end point may be detected, and setting based on the results of this detection. With the example shown in FIG. 5A, there is movement from direction D21 to direction D22, and the shooting process setting section 9 performs setting based on this movement (referred to FIG. 5A and to S59 in FIG. 9A). The shooting operations that have been set are output to the parameter calculation section for each condition 3. The shooting process setting section 9 functions as a shooting process settings section that sets shooting operations for a process from a start point to an end point.

Using the shooting process setting section 9 it becomes possible not only to set simple start point and end point, but also to preset speed when moving the camera and camera movement patterns. This means that photographic recording is possible where shooting control that conforms to movement at the time of a rehearsal before shooting a performance can be more accurately reproduced at the time of shooting a performance. Specifically, it becomes possible to record camerawork with a particular preference. This camerawork with a particular preference may include information such as from which shooting predetermined positions parameters will be changed.

The parameter calculation section for each condition 3 calculates shooting parameters based on output from the shooting parameter preliminary setting section 5, the condition determination section 7, and the shooting process setting section 9. Parameters such as shooting parameters are stored in the shooting parameter preliminary setting section 5 in association with shooting predetermined positions. The condition determination section 7 determines whether or not the camera is at a shooting position. A shooting process for other than shooting predetermined positions is stored in the shooting process setting section 9. The parameter calculation section for each condition 3 calculates shooting parameters for shooting predetermined positions and for other than shooting predetermined positions using some or all of the outputs from each of these sections.

Figure 9B:
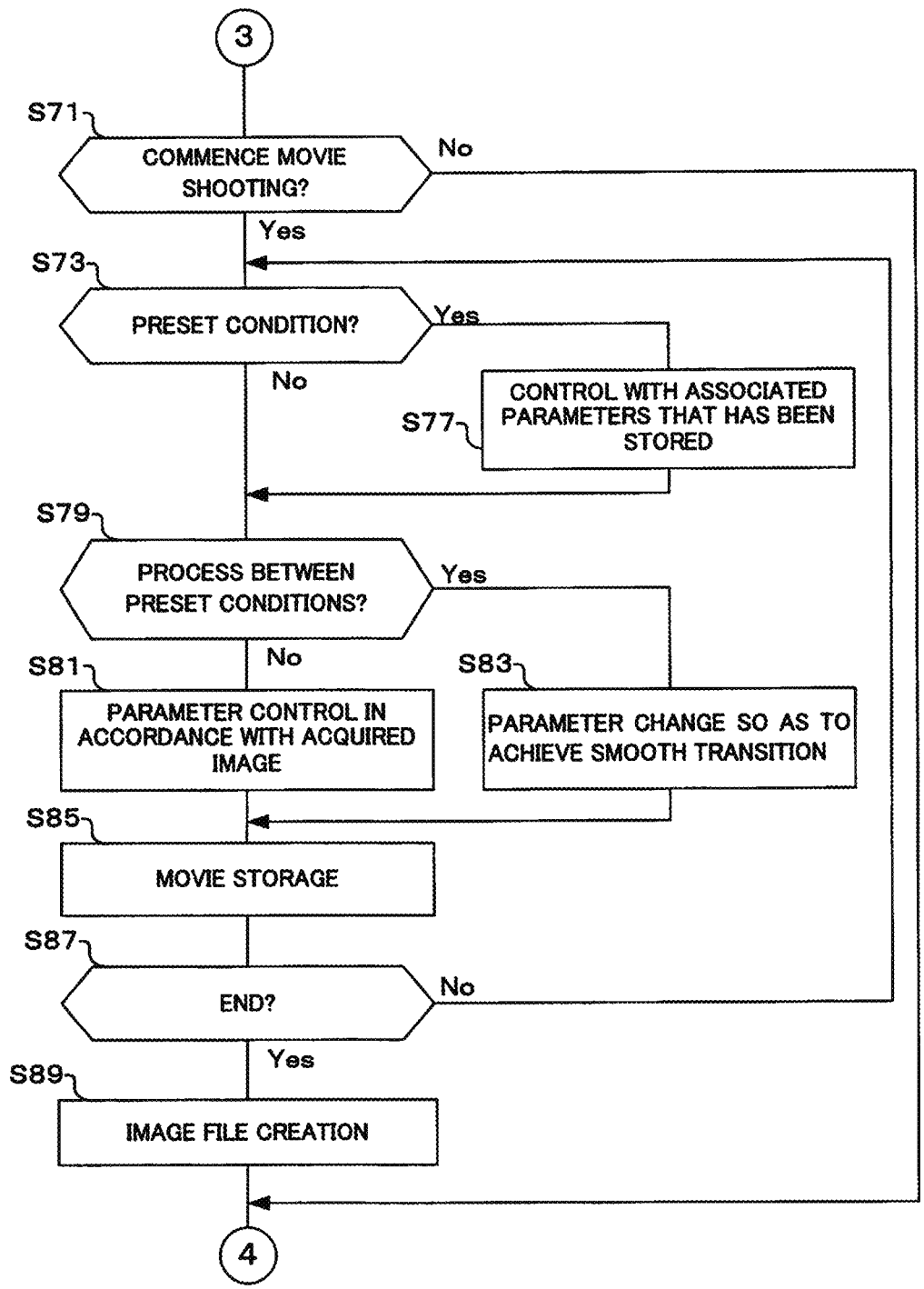

The parameter calculation section for each condition 3 functions as a parameter calculation section for each condition that calculates shooting parameters at the time of shooting a plurality of frames, in accordance with parameters that have been set in a shooting parameter preliminary setting section (refer, for example, to S29 in FIG. 4A and S83 in FIG. 9B, etc.). Also, for a trigger preset position that is closer to a movement commencement position than a convergent point preset position, the parameter calculation section for each condition calculates parameters so as to approach parameters of convergent point preset positions (refer, for example, to S29 in FIG. 4A). The parameter calculation section for each condition calculates corresponding parameter change between a plurality of shooting positions. The parameter calculation section for each condition calculates corresponding parameter change between an origin and end point (refer, for example, to S83 in FIG. 9B).

The shooting control section 1 comprises a photographing lens, an image sensor and an imaging control circuit etc., and generates image data by subjecting a subject image to photoelectric conversion. Also, in a case where a zoom lens is provided, the shooting control section 1 has a motor drive circuit for zooming, and is capable of carrying out focal length control in accordance with control signals from the parameter calculation section for each condition 3.

The shooting control section 1 also has a motor drive circuit for a focus lens, and is capable of carrying out focus adjustment control in accordance with control signals from the parameter calculation section for each condition 3. The shooting control section 1 also has exposure control circuits for temperature and electronic shutter etc. and is capable of carrying out exposure control in accordance with control signals from the parameter calculation section for each condition 3.

Figure 3B:
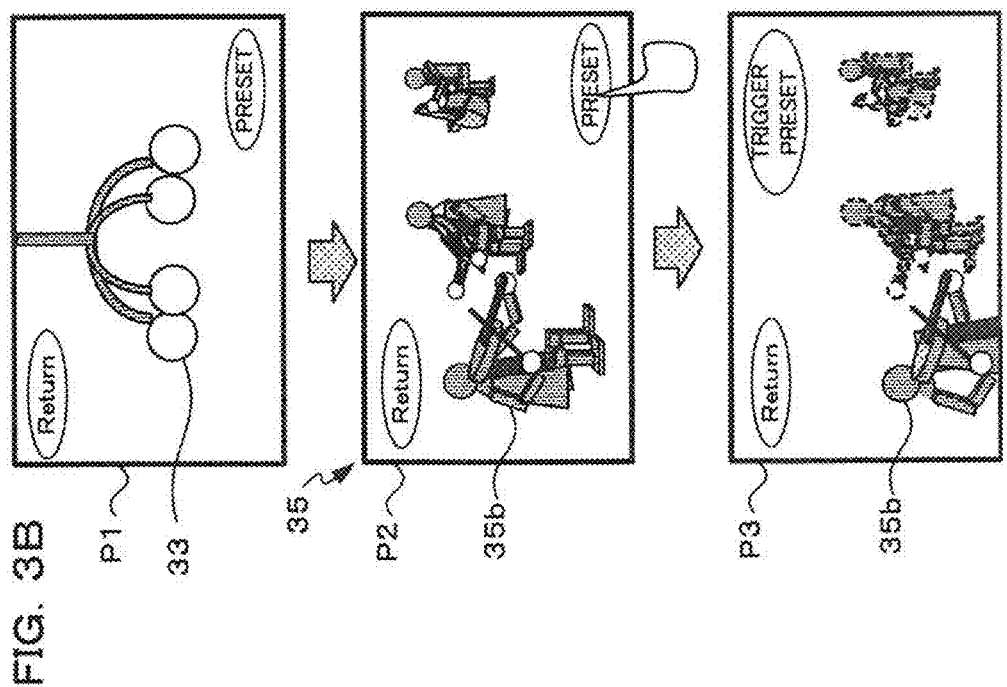
FIG. 3A and FIG. 3B are drawings for explaining a usage method of a camera of a first embodiment of the present invention.
Figure 4B:
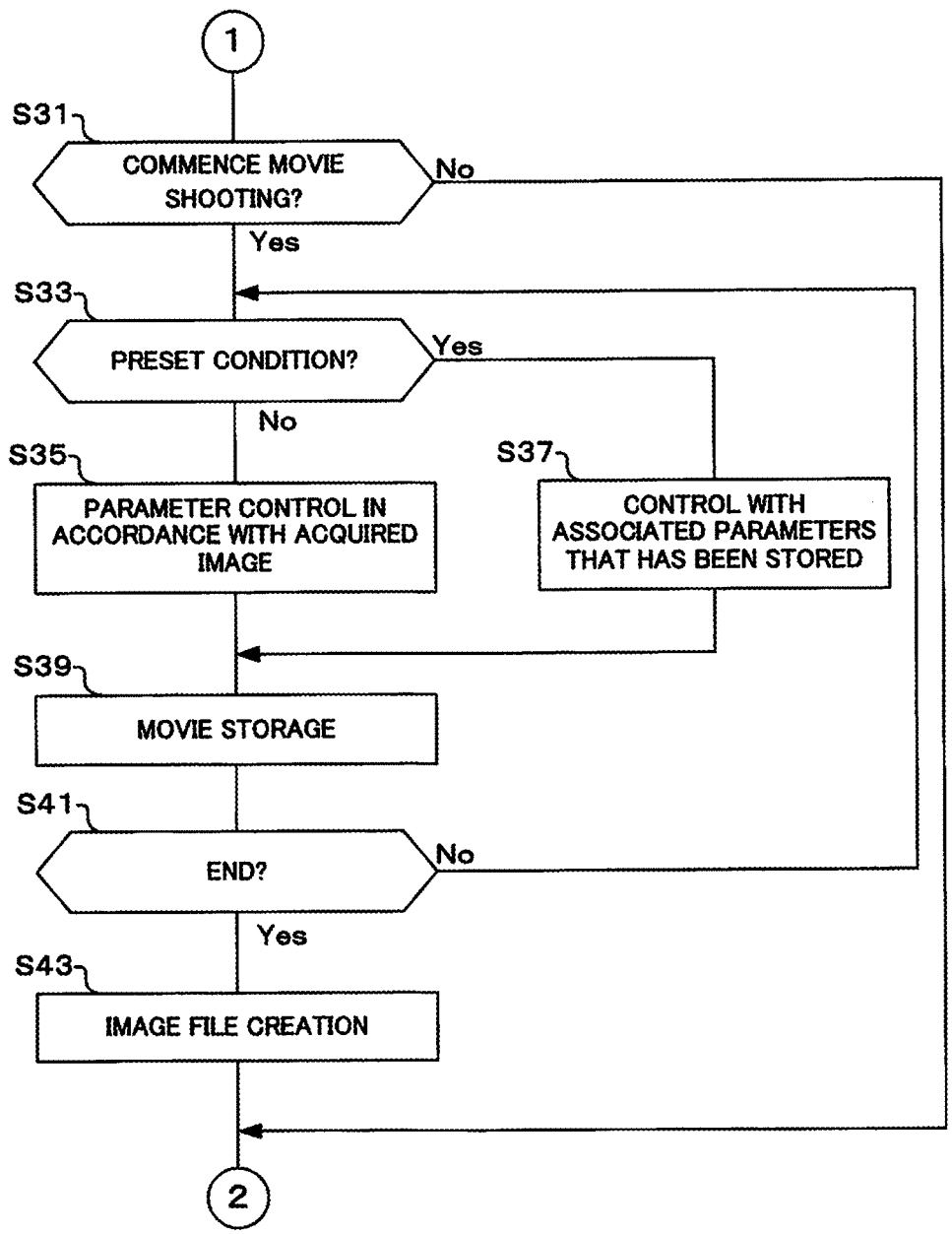
Figure 8:
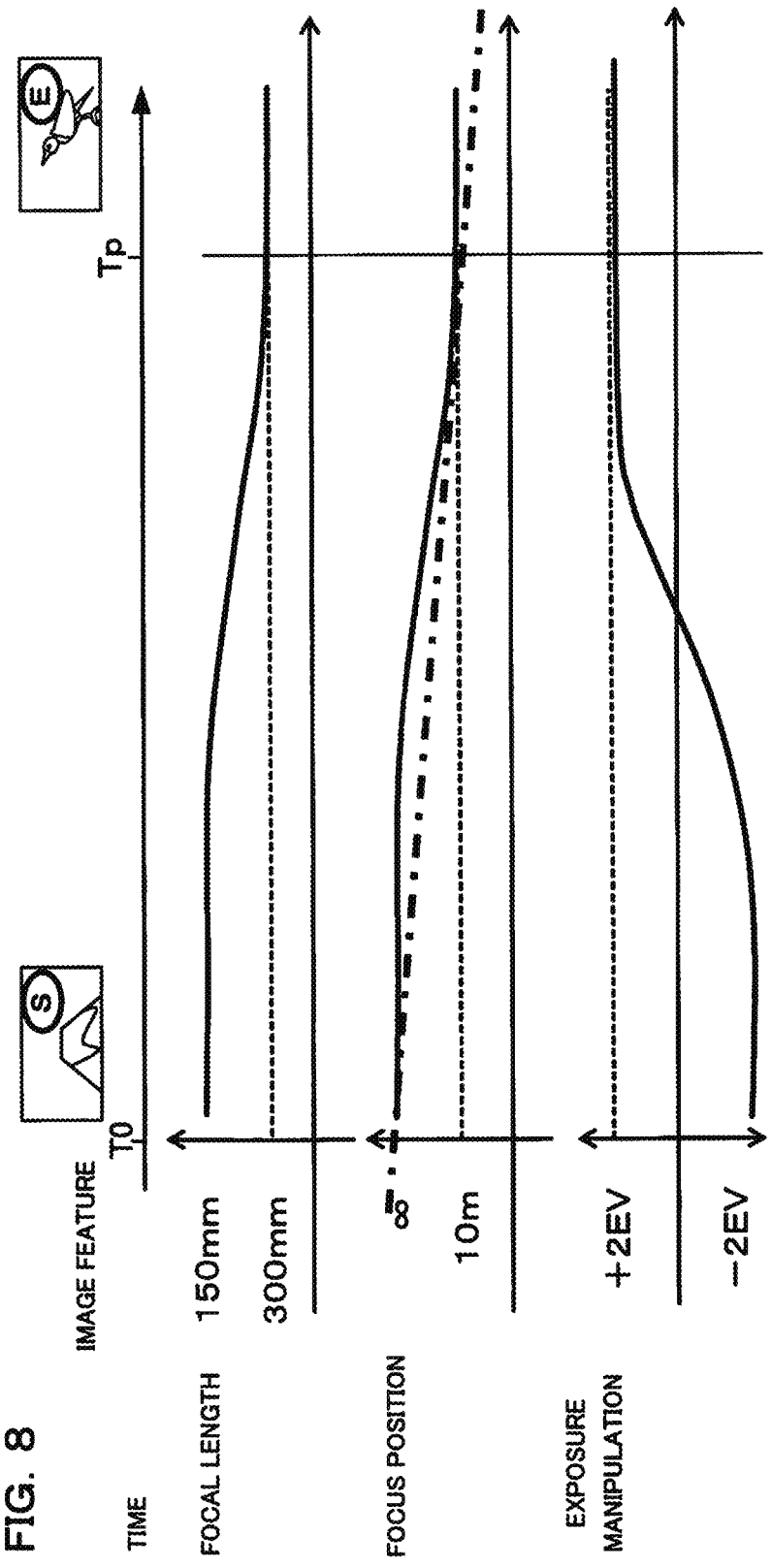
FIG. 8 is a graph showing change in shooting parameters, in the camera of the second embodiment of the present invention.

The shooting control section 1 functions as a shooting control circuit that performs shooting that applies the parameters that have been calculated (refer, for example, to FIG. 3B, S37 in FIG. 4B, FIG. 6A, FIGS. 8, and S73 and S83 in FIG. 9B). The shooting control circuit may be a control circuit for shooting, such as the previously described imaging control circuit, or motor drive circuit for a focus lens. The shooting control section 1 functions as a shooting control circuit that performs shooting that applies the shooting parameters that have been calculated by determining conditions (refer, for example, to FIG. 3B, S37 in FIG. 4B, FIG. 6A, FIGS. 8, and S73 and S83 in FIG. 9B). The shooting control circuit, in a case where it has been determined by the condition determination section that the camera is at a shooting position, performs control based on parameters that have been set by the parameter preliminary setting section (refer, for example, to S37 in FIG. 4B, and S77 in FIG. 9B, etc.).

Figure 2:
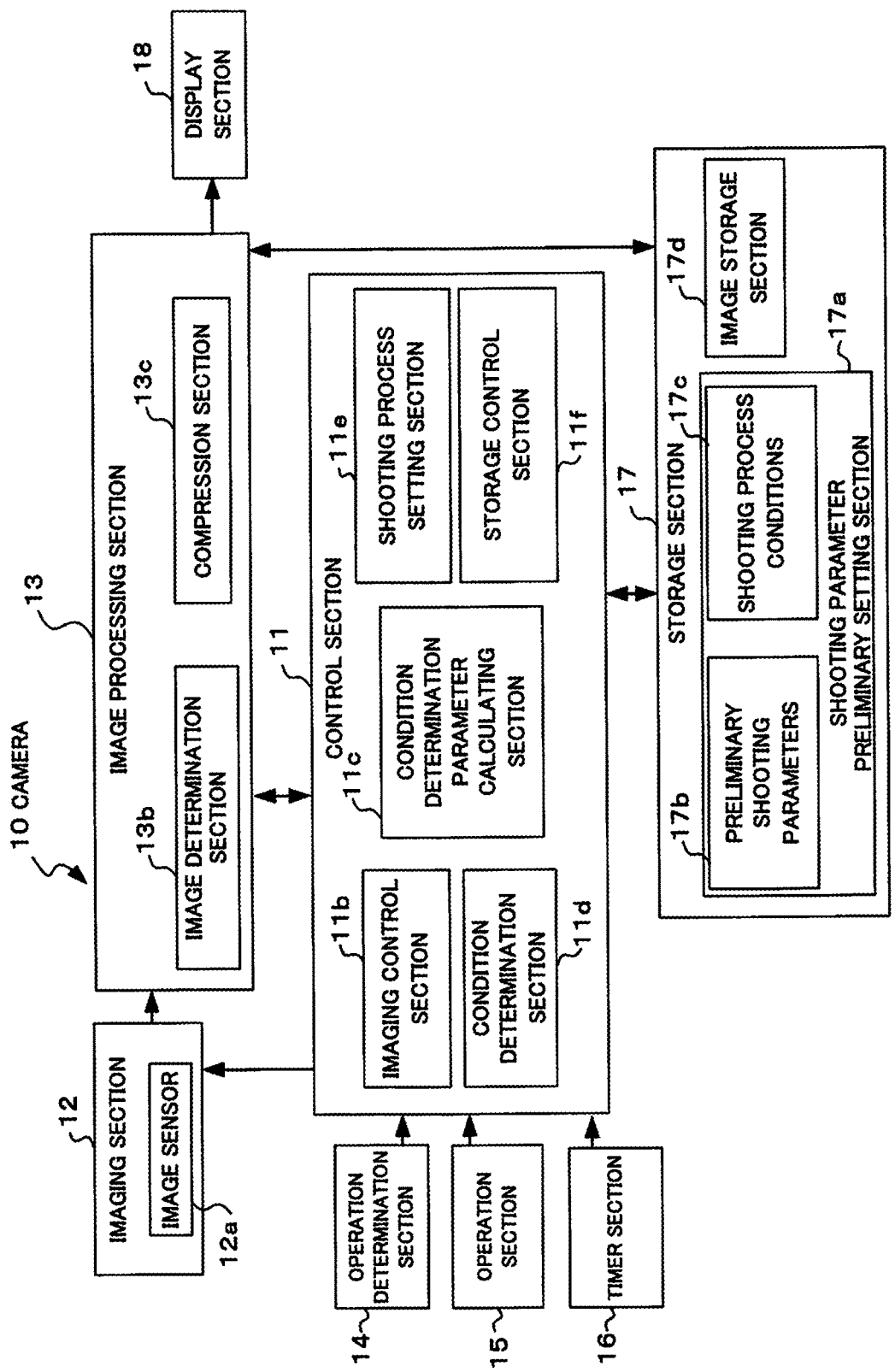
FIG. 2 is a block diagram mainly showing the electrical structure of a camera of a first embodiment of the present invention.

FIG. 2 is a block diagram further showing specific electrical structures of the schematic functional block diagram shown in FIG. 1.

The imaging section 12 of the camera 10 has functions of the shooting control section 1 of FIG. 1, has a photographing lens, an image sensor 12a and an imaging control circuit etc., and generates image data by subjecting a subject image to photoelectric conversion. The imaging section 12 functions as an image sensor that performs photoelectric conversion on a subject image, and outputs image data.

The imaging section 12 has a motor drive circuit for a focus lens, and is capable of performing focus adjustment control (autofocus control) in accordance with control signals from the control section 11. The imaging section 12 may also have a zoom lens and a motor drive circuit for zooming, and in this case can perform focal length control in accordance with control signals from the control section 11. The imaging section 12 also has control circuits for an aperture, mechanical shutter and/or an electronic shutter etc., and can perform exposure control in accordance with control signals from the control section 11. The imaging section 12 functions as a shooting control section that performs shooting that applies shooting parameters that have calculated by determining conditions.

The image processing section 13 has image processing circuits, is input with image data from the imaging section 12, and applies various image processing to this image data. The image processing section 13 comprises an image determination section 13b and a compression section 13c. It should be noted that with this embodiment the image processing section 13 is constructed separately from the control section 11. However, this is not limiting, and some of the functions of the image determination section 13b etc. may be realized in the control section 11, and some of the functions within the control section 11 maybe realized in image processing circuits within the image processing section 13.

The image determination section 13b performs recognition of images. The image determination section 13b determines whether or not images at the start point and endpoint etc. of shooting, and/or images at shooting predetermined positions where preliminary setting of shooting parameters has been performed, are the same. If the result of this determination is that it has been determined that there are the same images, the image determination section 13b outputs this fact to the control section 11. The compression section 13c has an image compression circuit, and performs image compression on image data from the imaging section 12. Image data that has been subjected to compression processing is output to a storage section 17. Also, image data that has been subjected to image processing for display is output to a display section 18.

The display section 18 has a display monitor (display) arranged on a rear surface of the camera body, and/or a monitor (display) for display such as an electronic viewfinder (EVF) that is viewed by means of an eyepiece. Live view display for subject viewing, playback display that is performed based on image data that has been stored in the storage section 17, and display of setting screens, such as menu screens, is performed on this display section 18. The display section 18 functions as a display that displays live view based on image data, before continuous shooting comprising a series of a plurality of frames (refer, for example, to FIG. 3A, S17 in FIG. 4A, and S51 in FIG. 9A etc.). The display displays live view images that have been controlled by parameters that have been set by the parameter preliminary setting section (refer, for example, to S17 in FIG. 4A).

The storage section 17 has an electrically rewritable nonvolatile memory, such as flash memory, and electrically rewritable volatile memory such as SDRAM (Synchronous Dynamic Random Access Memory). The storage section 17 has the shooting parameter preliminary setting section 17a that stores preliminary shooting parameters 17b and shooting process conditions 17c. The shooting parameter preliminary setting section 17a has functions of the shooting parameter preliminary setting section 5 in FIG. 1.

The preliminary shooting parameters 17b store preliminary shooting parameters that have been set by the photographer before movie shooting, in association with shooting predetermined positions such as convergent point preset positions and/or start point and end point. When shooting conditions for other than shooting predetermined positions for which predetermined shooting parameters have been stored have been set by the photographer, the shooting process conditions 17c store these shooting conditions. For example, camera movement from a start point to an endpoint is detected, and this movement is stored.

The storage section 17 also has an image storage section 17d. This image storage section 17d stores image data that has been acquired by the imaging section 12, subjected to image processing by the image processing section 13, and subjected to image compression by the compression section 13c.

A movement determination section 14 comprises at least one of a Gyro, an acceleration sensor, a direction sensor, an inclination sensor and a GPS (Global Positioning System), and determines movement of the camera 10. Determination is also possible as to whether the camera is at a position that has been designated as a shooting predetermined positions, such as a convergent point preset position, start point, and/or endpoint etc.

The operation section 15 has operation members such as a power switch, release button, movie button, cross-shaped button, OK button, operation dial, and/or operation switch etc. The operation section 15 may also have a search panel for detecting touch operation etc. on a display panel of the display section 18. Detection results of the operation members and touch panel etc. that have been detected by the operation section 15 output to the control section 11. The operation section 15 functions as an operation member for setting parameters.

A timer section 16 has a timer function and a calendar function, and outputs time information and calendar information to the control section 11.

The control section 11 is made up of an ASIC (application-specific integrated circuit) including a CPU (central processing unit) etc., and performs unified control of each section within the camera 10. This control is executed in accordance with a program that has been stored in nonvolatile memory within the control section 11.

An imaging control section 11b, parameter calculation section for each condition 11c, condition determination section 11d, shooting process setting section 11e, and storage control section 11f are provided within the control section 11, and these sections are mainly realized using programs that have been stored in memory. The control section 11 functions as a controller that has a parameter preliminary setting section, parameter calculation section for each condition, shooting process settings section, and condition determination section.

The imaging control section 11b controls a focus lens, zoom lens, and exposure control section etc. within the imaging section 12. Specifically, in a case where focus lens position, zoom position, aperture value, electronic shutter speed, ISO sensitivity etc. have been designated by the parameter calculation section for each condition 11c, control of the imaging section 12 is performed in accordance with these control values. The imaging control section 11b corresponds to the shooting control section 1 in FIG. 1.

The parameter calculation section for each condition 11c has functions of the parameter calculation section for each condition 3 in FIG. 1. When the camera is at a shooting predetermined position that has been set in advance, the parameter calculation section for each condition 11c calculates shooting parameters for shooting control based on shooting parameters that are stored in the preliminary shooting parameters 17b. Also, when the camera is not at a shooting predetermined position, the parameter calculation section for each condition 11c calculates shooting parameters for shooting control based on shooting process conditions 17c that have been set by the shooting process setting section 11e.

The condition determination section 11d has functions of the condition determination section 7 of FIG. 1, and determines whether the camera is at a shooting predetermined positions (such as a convergent point preset position, start point position, end point position etc.) based on determination results of the movement determination section 14 or the image determination section 13b. If the camera is at a shooting predetermined positions, that fact is output to the parameter calculation section for each condition 11c.

The shooting process setting section 11e has functions of the shooting process setting section 9 in FIG. 1, and sets a shooting process by the photographer for other than shooting predetermined positions. Specifically, since the photographer sets a shooting process using the operation section 15, a shooting process is stored as shooting process conditions 17c within the shooting parameter preliminary setting section 17a based on the operation at that time. That is, it is possible to accurately store how the photographer has moved the camera (camera work), such as a rehearsal before shooting etc. If from where, to where, and in what type of pattern and at what speed the camera was directed is stored, it becomes possible for movement at the time of a rehearsal to be made to match movement at the time of shooting at performance. With this embodiment, description is given not for control that is always performed at the time of movie shooting, but for control that starts at the time "rehearsal mode" has been set.

The storage control section 11f performs storage control for various information such as image data, and preliminary shooting parameters 17b and shooting process conditions 17c, within the storage section 17.

The camera (shooting device) of this embodiment has a rehearsal mode for performing preliminary parameter setting while shooting of a plurality of frames is being performed, before continuous shooting comprising a series of a plurality of frames (performance movie shooting). For the purpose of this rehearsal mode there is a parameter preliminary setting section that performs preliminary parameter setting. It should be noted that the camera of this embodiment comprises a parameter calculation section for each condition that calculates parameters for each frame at the time of shooting a plurality of frames in accordance with parameters that have been set in the parameter preliminary setting section, and a shooting control section that performs shooting control for continuous shooting of a performance comprising a series of a plurality of frames to which the calculated parameters have been applied.

Figure 3A:
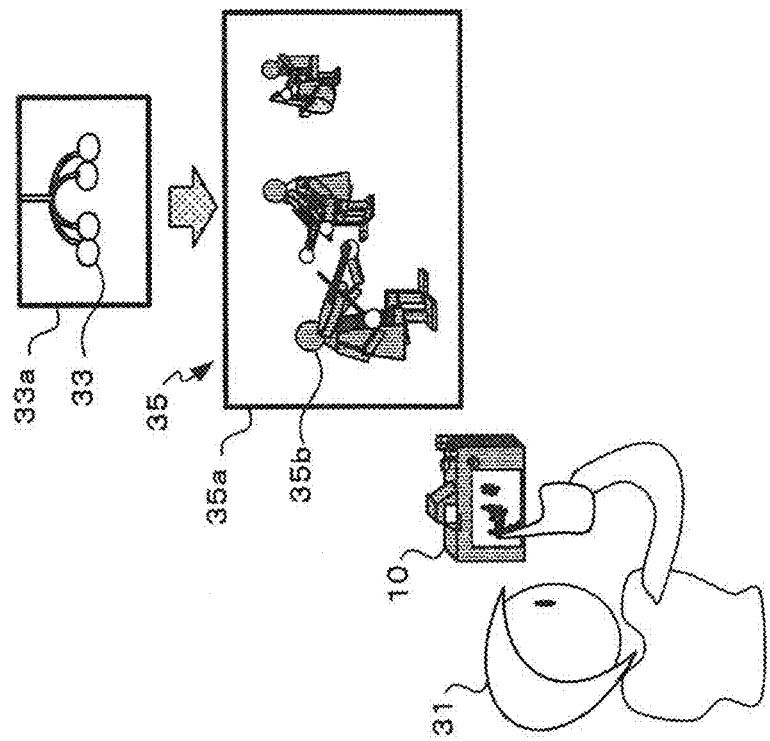

Next, setting operation at the time of movie shooting of this embodiment will be described using FIG. 3A and FIG. 3B. FIG. 3A shows prior setting (preliminary setting) of the camera, when the photographer 31 performs movie shooting of a chandelier 33 and an ensemble (orchestra in a room) using the camera 10. Specifically, the shooting objective of the photographer 31 is first to shoot the chandelier 33 with an image frame 33a. After that, the photographer 31 moves the shooting direction of the camera 10 to face downwards while changing focal length of the camera 10 to the wide angle side, and shoots the ensemble 35 with the image frame 35a. Finally, the photographer 31 thinks that they wish to complete movie shooting by focusing on an orchestra member 35b at the left side.

With this embodiment, a subject to be focused on at a convergent point preset position (either timing or shooting position at the time of movie shooting) is designated without designating a start point for movie shooting. Also, shooting control is performed so that shooting conditions can be smoothly approximated to shooting conditions for an end point position (convergent point) from shooting conditions for a trigger preset position ahead of a convergent point preset position. It should be noted that in order to simplify the description, description will be given for an example where the photographer performs zooming, and only focusing is controlled as a shooting parameter.

It should be noted that with this embodiment a convergent point preset position is made a shooting position for which the photographer wants to designate parameters, such as focus, angle of view, exposure correction value, image processing, special image processing etc. Resolution may also be changed in accordance with circumstances. Also, designation of timing as a convergent point preset position means a shooting position at the time when a given time has elapsed from a movie shooting start point or the like. Preset conditions are made shooting position, and parameters that are associated with this shooting position.

FIG. 3B shows an image that is subjected to live view display on the display section 18 of the camera 10. First, initial live view image P1 is showing a state where the camera 10 has the chandelier 33 in close-up. "PRESET" and "Return" icons are displayed on the live view screen. In a case where a "rehearsal mode" etc. has been set, these icons may constitute a user interface such as shown in FIG. 3B.

The photographer 31 gradually directs the camera 10 downwards, and changes focal length towards the wide-angle side. Once a position that the photographer 31 considers to be an end point position for the movie shooting is reached, the "PRESET" icon displayed on the screen of live view image P2 is touched and a convergence preset position is set. Also, at this time, by performing a touch operation on a member 35 of the ensemble are, focusing on that ensemble member 35b is instructed.

Next a shooting position (trigger preset position) is set where control is commenced to approach the shooting parameters (here, focus position) that have been set at this convergence preset position. If a convergence preset position has been set, a "TRIGGER PRESET" icon is displayed on the screen of the live view image P3. If this icon is displayed, the photographer 31 performs a touch operation on the "TRIGGER PRESET" icon at the position where it is desired to commence the control by slightly rewinding from the movie shooting end point. In this way a trigger preset position is set.

In this manner, with the example shown in FIG. 3A and FIG. 3B, in preliminary shooting (prior setting operation, rehearsal) the photographer can designate end point position for movie shooting by performing a touch operation on a "PRESET" icon, and can also perform shooting parameters setting for the time of movie shooting completion by performing a touch operation on a subject they wish to focus on. It is further possible to set a position where this shooting control will be commenced (trigger preset position, so that control is executed smoothly based on shooting parameters at the time of this movie shooting completion. It should be noted that with this embodiment, at the time of actual shooting, it is possible to continuously perform movie shooting even beyond the end point position (shooting is possible up to performing a completion operation, in S41 of FIG. 4B).

Next, a shooting control operation of this embodiment at the time of movie shooting will be described using the flowcharts shown in FIG. 4A and FIG. 4B. This flow is realized by the CPU within the control section 11 controlling each section within the camera 10 in accordance with programs.

If the shooting control operation is commenced, it is first determined whether or not a preset condition is satisfied (S11). A convergence preset position (for example, movie shooting end point position, or selected screen) is set in step S23, which will be described later, and a trigger preset position is set in step S27, and these positions are stored in the shooting parameter preliminary setting section 17a. In this step, the condition determination section 11d determines whether or not there is a match to these two conditions that have been stored, and if the result of this determination is that there is a match it is determined that a preset condition is satisfied. Further, it is also determined that a preset condition is satisfied between the trigger preset position and the convergence preset position.

If the result of determination in step S11 is that it has been determined that a preset condition is not satisfied, parameter control is performed in accordance with an image that has been acquired (S13). Here, normal shooting parameter control is performed for an image that was acquired in the imaging section 12. Specifically, normal control is performed regardless of the preliminary shooting parameters 17b and the shooting process conditions 17c. For example, for exposure control normal AE control is performed, and for focusing normal AF control is performed. However change in shooting conditions need not be handled in real time, and parameters that have been previously determined may also be maintained.

On the other hand, if the result of determination in step S11 is that it has been determined that a preset condition is satisfied, shooting parameter control that has been associated with preset position and stored is performed (S15). Here, control is performed in accordance with shooting parameters that were set at a shooting predetermined positions (preset position). From a trigger preset position to a convergence preset position, control is performed with shooting parameters that have been calculated by the parameter calculation section for each condition 11c, so as to become smooth, in accordance with the shooting process conditions 17c. With the example shown in previously described FIG. 3A and FIG. 3B, focus control is performed so as to focus on the member 35b.

If shooting parameter control has been performed in step S13 or step S15, live view display is performed (S17). Here, live view display is performed on the display section 18 based on image data that has been acquired by the imaging section 12. If shooting control has been performed with parameters that have been set, in S15, it is possible to confirm how shooting will be performed at the time of movie shooting in advance, and it is possible to perform a shooting rehearsal.

If live view display has been performed, it is next determined whether or not control for shooting has been performed (S19). Here determination is as to whether or not the operation section 15 has been subjected to control for shooting, such as by being operating with a zoom ring, distance ring, or a setting member for aperture or shutter speed etc. or a touch operation. It is also possible to input predetermined parameters at the time of communication or storage readout, even when it has not been determined to be a rehearsal.

If the result of determination in step S19 is shooting control, shooting control is executed in accordance with operation (S21). Here control is performed in accordance with an operation that has been determined by the movement determination section 14.

Once shooting control has been performed, it is next determined whether or not the shooting control is a convergent point preset (S23). For example, as was described using FIG. 3B, for a convergence preset position the photographer touches a "PRESET" icon. In this step it is determined whether or not a touch operation has been performed on the "PRESET" icon. It should be noted that besides touch operation on an icon, setting of a preset position may also be set using another operation, such as a release button operation or OK button operation etc. Setting may also be performed with a tap operation on the camera, and may be set with image determination of photographer gestures.

If the result of determination in step S23 is that there is a convergent point preset, a scene and parameters are stored in association with each other (S25). Here, the movement determination section 14 detects a position corresponding to the convergent point presets, and this convergent point preset position, and shooting parameters that have been set at this time, are stored in the shooting parameter preliminary setting section 17a as preliminary shooting parameters 17b. With the example shown in FIG. 3B, the fact that the member 35b is focused on is stored for the position at which live view image P2 was acquired.

If storage has been performed in S25, or if the result of determination in step S23 is that there is not a convergent point preset, it is next determined whether or not there is a trigger preset (S27). For example, as was described using FIG. 3B, the photographer touches a "TRIGGER PRESET" icon at a position that is closer to a movement commencement position than the convergent point preset position. It should be noted that the touch position of the "TRIGGER PRESET" icon is a position where control to approach a shooting parameter is commenced. In this step it is determined whether or not a touch operation has been performed on the "TRIGGER PRESET" icon. It should be noted that besides touch operation on an icon, setting of a trigger preset position may also be set using another operation, such as a release button operation or OK button operation etc.

If the result of determination in step S27 is that there is a trigger preset, then conditions to approach convergent point preset shooting are stored (S29). Here, a position corresponding to a convergent point preset is detected by the movement determination section 14, and this trigger preset position is stored. Also, from the trigger preset position to the convergent point preset position, the parameter calculation section for each condition 11c calculates shooting parameters such that taken images change smoothly, and stores these shooting parameters as shooting process conditions 17c. With the example shown in FIG. 3B, control data for changing focus lens position gradually, so that the member 35b is focused on naturally, is stored.

If conditions have been stored in step S29, or if the result of determination in step S27 is that there is not a trigger preset, or if the result of determination in step S19 is that a shooting control operation has not been performed, whether or not to commence movie shooting is determined (S31). If the photographer operates the movie button within the operation section 15, movie shooting is commenced. In this step determination is based on operating state of the movie button. If the result of this determination is not commencement of movie shooting, processing returns to step S11.

On the other hand, if the result of determination in step S31 is movie shooting commencement, it is first determined whether or not a preset condition is satisfied (S33). Storage of a preset position is performed in steps S25 and S29. In this step, the condition determination section 11d determines whether or not the camera is at a preset position based on determination results of the movement determination section 14 and the image determination section 13b.

If the result of determination in step S33 is that a preset condition is not satisfied, parameter control is performed in accordance with an image that has been acquired (S35). Here, normal shooting parameter control is performed for an image that was acquired in the imaging section 12. Specifically, normal control is performed regardless of the preliminary shooting parameters 17b and the shooting process conditions 17c. For example, for exposure control normal AE control is performed, and for focusing normal AF control is performed.

On the other hand, if the result of determination in step S33 is that a preset condition is satisfied, control is performed with a parameter that has been stored in association with that preset condition (S37). Here, control is performed in accordance with shooting parameters that were set at a shooting predetermined position (convergence preset position, trigger preset position). From a trigger preset position to a convergence preset position, control is performed with shooting parameters that have been calculated by the parameter calculation section for each condition 11c, so as to become smooth, in accordance with the shooting process conditions 17c. With the example shown in previously described FIG. 3B, focus control is performed so as to gradually focus on the member 35b.

If parameter control has been performed in step S35 or S37, movie storage is performed (S39). Here, image data output from the imaging section 12 is subjected to image processing such as compression for movie storage by the image processing section 13, and temporarily stored in the storage section 17.

Once movie storage has been performed, it is next determined whether or not shooting is finished (S41). After movie shooting commencement, if the photographer operates the movie button within the operation section 15 again, movie shooting is finished. In this step determination is based on operating state of the movie button. If the result of this determination is not finishing of movie shooting, processing returns to step S33 and movie shooting continues. Also, during this time, if a preset condition is met, then shooting control for the camera 10 is performed in accordance with parameters that were stored in step S25 or in step S29.

If the result of determination in step S41 is completion, image file creation is performed (S43). Here, image data of a movie that was temporarily stored in the storage section 17 is made into a file, and this image file is stored in the image storage section 17d. Once the image file has been stored, processing returns to step S11.

In this way, with the first embodiment of the present invention, before actual shooting of a movie shooting parameters are previously stored in association with convergent point preset positions for movie shooting (S25 in FIG. 4A). Then, at the time of actual shooting, when a convergent point preset is reached, control is performed in accordance with the shooting parameters that have been stored (S37 in FIG. 4B). With the example shown in FIG. 3B the shooting is terminated in a state where the orchestra member 35b is focused on. Generally, commencing shooting of a movie after having set composition, focus, angle of view, exposure control etc. in line with the photographer's intention is easy. However, since a movie records changes in an image over time, it is not possible to predict what will occur in the future, and it is difficult to perform shooting in a desired manner. Also, in a movie, flow (movement or change to things over time) is an element of the performance, and flow is disrupted by performing camera operations during shooting. It is therefore difficult to perform settings as desired at specified shooting positions during shooting of a movie. In this regard, with this embodiment, since it is possible to previously set shooting parameters for convergent point preset positions, shooting in line with the photographer's intentions can be performed easily.

Also, with this embodiment, at the time of setting parameters before hand, it is possible to confirm temporal change to the screen due to composition or parameters. This confirmation is an important factor at the time of ascertaining if shooting is as the user desires. From this viewpoint, with this embodiment attention is given to preset operations at the time of prior setting. At the time of prior setting (rehearsal), it is possible in advance to obtain various information on operations that will be performed at the time of shooting, and it is possible to predict problems at the time of shooting, and the effects of shooting. In a case where a problem is anticipated it is also possible to perform trial and error until that problem is solved or the problem is alleviated. Also, the rehearsal may be reflected as is in actual shooting, and may be modified and reflected at the time of actual shooting. This is because at the time of practice and at the time of shooting there may be differences in the user's movements, and change in circumstances of the object being shot.

Also, with this embodiment, a trigger preset position is stored at a position that is closer to the camera movement commencement position than a movie shooting convergent point preset position, and from this trigger preset position until a convergent point preset position shooting parameters are changed so as to be close to shooting parameters that were set at the convergent point preset position (S29 in FIG. 4A, S37 in FIG. 4B). This means that it is possible to make a series of images stable from the trigger preset position until the convergent point preset position, and as well as enabling natural transitions it is possible to secure a desired effect at the convergent point preset position. It is also possible to prevent control with parameters that have suddenly been set at a convergent point preset position, and it is possible to cause smooth change between images.

Also, with this embodiment, preset conditions are set in advance before movie shooting (S25 and S29 in FIG. 4A), and if a preset condition is met control is performed with the parameters that have been set, and an image that has been required at this time is subjected to live view display (S11, S15 and S17 in FIG. 4A). This means that it is possible to confirm a movie prior to actual shooting, and it is possible to easily perform a shooting rehearsal. In a case where a rehearsal image is looked at and it is not as the photographer intended, preset conditions may be changed again.

It should be noted that the parameters are not limited to shooting parameters for the imaging section, such as focus (focus position), angle of view (focal length) exposure control (aperture value, electronic shutter speed, ISO sensitivity, exposure correction value) etc., and may be parameters for image processing, such as white balance, art filter, etc. Also, the number of parameters stored at the time of presets is not limited to 1, and a plurality of parameters maybe set. Also, as a parameter setting method, various methods are possible, such as a method that uses a touch operation on a screen of the display section 18, and setting using operation members such as an operation button, operation dial, distance ring, zoom ring etc.

Also, the setting parameters may be performed in combination with various other shooting modes such that a manual mode may be switched to from an initially set aperture priority automatic exposure mode during shooting. In this case, it is possible to render various effects by user operation during rehearsal. There may also be a transfer to a mode that combines a plurality of images, such as a super resolution mode where shooting is performed while staggering pixels, and combined, HDR (High Dynamic Range) mode where images of a plurality of exposures are combined, or focus stacking mode that combines a plurality of images for different focus positions, and it may be possible to cancel the mode that has been switched to. It may also be possible to change shooting frame rate, to be able to handle slow-motion, and fast-forward playback.

Also, in this embodiment, a trigger preset position has been set manually by the photographer (S27 in FIG. 4A). This is not limiting, however, and a trigger preset position may be set in accordance with convergent point preset position, for example, set automatically to a position that is a given distance ahead etc. Also, with this embodiment, scenes and parameters at a convergent point preset position have been associated with each other, but as long as scenes in this case are identical or similar images, shooting direction or position are not critical.

Next, a second embodiment of the present invention will be described using FIG. 5A to FIG. 10. With the first embodiment, before movie shooting convergence preset conditions were previously stored, and further a trigger preset condition was also stored in advance before a convergence preset so that images change smoothly at the time of a convergence preset. Differing from this, with this embodiment preset conditions for start point and end point of movie shooting are stored, and movie shooting is performed based on these preset conditions. It should be noted that shooting may be started ahead of the start point, and shooting may continue beyond the end point.

The structure of this embodiment is the same as in the block diagrams shown in FIG. 1 and FIG. 2 for the first embodiment, and so detailed description has been omitted.

FIG. 5A shows one example of appearance when the photographer is performing preliminary shooting (prior setting, rehearsal) before performing video shooting. Also, FIG. 5B shows one example of live view images displayed on the display section 18 at the time of preliminary shooting. If "rehearsal mode" etc. is set, then a user interface as was described for this embodiment maybe displayed. If it is other than rehearsal mode, icons such as shown in FIG. 5B may be displayed.

The photographer 31 first directs the camera 10 in direction D21 towards Mount Fuji, with the intention of setting an image within the border 41a as a movie shooting start point. At this time, a "start point" icon i21 is displayed on the screen P21 of the display section 18 (refer to FIG. 5B), and the photographer 31 performs a touch operation on the icon i21. In this way, the camera 10 stores direction D21 (or an image that has been acquired at this time), border 41a at this time (corresponding focal length), focus position, and exposure correction value as preset conditions for the start point position.

Next, the photographer 31 directs the camera 10 from direction D21 in direction D21 towards a small bird 44, with the intention of setting an image within the border 44a as a movie shooting end point. At this time, an "end point" icon i22 is displayed on the screen P22 of the display section 18 (refer to FIG. 5B), and the photographer 31 performs a touch operation on the icon i22. In this way, the camera 10 stores direction D22 (or an image that has been acquired at this time), border 44a at this time (corresponding focal length), focus position, and exposure correction value as preset conditions for the endpoint position.

Also, as was described previously, the photographer 31 intends to perform movie shooting while removing the camera 10 from the start point direction D21 to the endpoint direction D22. Therefore, during the movement of the camera 10 from the start point direction D21 to the end point direction D22 the camera 10 detects shooting parameters and camera movement, and these detection results are stored in the shooting parameter preliminary setting section 17a within the storage section 17.

If the photographer has performed preliminary shooting (rehearsal) such as shown in FIG. 5A and FIG. 5B, next movie shooting is performed. FIG. 6A shows one example of appearance at the time of movie shooting. The photographer 31 commences smooth movement of the camera 10 from the direction oat the left side of FIG. 6A towards the right side (arrow A in the drawing). Movie shooting then commences when the photographer 31 has directed the camera 10 in direction D21, and movie shooting is completed when the camera is directed in direction D22. Also, during that movement panning shooting is automatically performed in the direction of arrow B, and focal length is automatically changed from border 41a to border 44a, giving borders 42a and 43a. Focus position and exposure correction value are also changed automatically so as to give smooth images.

FIG. 6B shoes one example of display on the display section 18 during video shooting. The screen P23 shows a display image at the time of shooting with the order 42 a in FIG. 6A, and has an image Ps at the start point time and an image Pe at the end point time displayed as sub-screens at the lower left and lower right of the screen P23 respectively. Since the photographer 31 can perform video shooting while looking at the start point image Ps and the end point image Pe and using these images as a guide, it is possible to easily perform panning shooting as was rehearsed.

Figure 7:
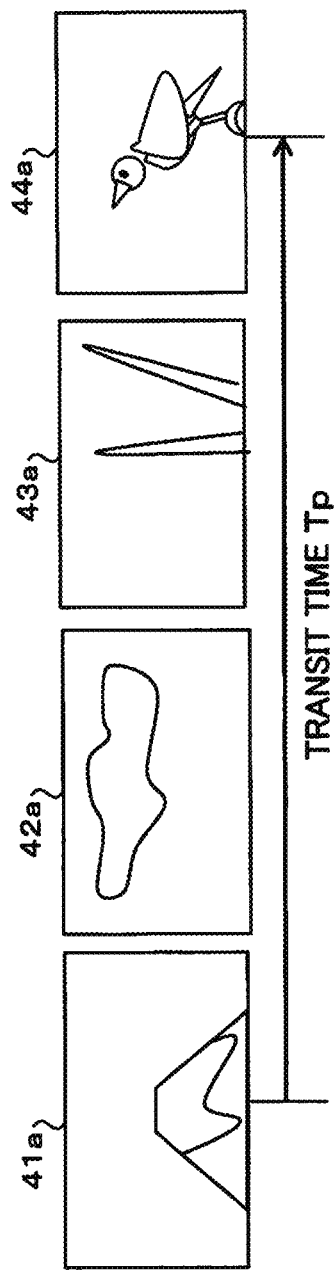
FIG. 7 is a drawing showing a movie that has been taken with the camera of the second embodiment of the present invention.

FIG. 7 shows one example of an image that has been acquired by the video shooting in FIG. 6A. Although only four images are shown in FIG. 7, during video shooting many images are stored sequentially. Images are sequentially acquired during transition time Tp, along the panning shooting direction (arrow B) that was shown in FIG. 6A.

FIG. 8 shows change in shooting parameters at the time of panning shooting. Time T0 corresponds to the video shooting start point, and time Tp corresponds to the video shooting end point. With the example shown in FIG. 8, at the time of shooting Mount Fuji at time T0 focal length is 150 mm, focus position is at infinity, and exposure correction is −2 EV. These shooting parameters correspond to preset conditions for the start point.

Also at the time of shooting the small bird at time Tp, focal length is changed towards the telephoto end to become 300 mm, focus position is changed toward being closer in to become 10 m, and the exposure correction is changed towards overexposure to become +2 EV. These shooting parameters correspond to preset conditions for the end point. Shooting parameters that fall between the start point and the end point are then sequentially changed in accordance with respective shooting parameters, as shown in FIG. 8.

It should be noted that two examples of change in focus position are shown in FIG. 8, by a solid line and a dot and dash line. In the case of the example shown by the dot and dash line focus changes linearly resulting in images in which any subject is sequentially focused on, which means that since these images are always in focus it will probably result in images that seem irritating. On the other hand in the case of the example shown by the solid line, depiction of individual subjects shown along points the camera is moving through is not strictly adhered to, resulting in a movie in which depiction of important images of the start point and end point are emphasized. Images that have been taken with the parameters shown by the solid line impart a regretful effect, that is easy on the eye.

Next, a shooting control operation of this embodiment will be described using the flowcharts shown in FIG. 9A and FIG. 9B. This flow is realized by the CPU within the control section 11 controlling each section within the camera 10 in accordance with programs.

If operation for shooting control commences, live view display is first performed (S51). Here, live view display is performed on the display section 18 based on image data that has been acquired by the imaging section 12.

Once live view display has been performed, it is next determined whether or not operation for shooting control has been performed (S53). Here determination is as to whether or not the operation section 15 has performed operation of a zoom ring, distance ring, or a setting member for aperture or shutter speed etc. or has performed control for shooting, such as a touch operation.

If the result of determination in step S53 is that operation for shooting control has been performed, shooting control is executed (S54). Here control is performed in accordance with an operation that has been determined by the movement determination section 14.

Once shooting control has been performed, it is next determined whether or not there is a preset "start" (S55). As was described using FIG. 5A, at the time of preliminary shooting for video shooting (at the time of reversal) the photographer performs a touch operation on a "start point" icon i21 for commencement position of video shooting. In this step, therefore, determination is based on whether or not a touch operation of the icon i21 has been performed.

If the result of determination in step S55 is that there is a "start" preset, a scene and parameters are stored in association with each other (S57). Here, the movement determination section 14 detects a position corresponding to the start point preset, and this start point preset position, and shooting parameters that have been set at this time, are stored as preliminary shooting parameters 17*b*. With the example shown in FIG. 5A, focus position (infinity), focal length corresponding to the border 41*a* (for example 150 mm), and exposure correction value (for example, +2 EV) for the main subject (Mount Fuji here) are stored in association with the position at which the image for the direction D21 was acquired (refer to FIG. 8).

In step S57, as scene information representing the scene there may be the image itself that has been acquired, may be information resulting from analysis of the image that has been acquired, and may be simply scene brightness and features and colors etc. of a subject or object that has been detected. Also, not being limited to such scene information that is based on an image, and it is also possible to substitute with orientation and gravitational force, acceleration with any timing as a reference, and time course of this acceleration, etc. Also various combinations of these may be used as scene information as appropriate. In a case where a plurality of items of information represent contradictory scenes, which results are utilized may be switched as appropriate If storing of parameters has been performed in step S57, or if the result of determination in step S55 was that there was not a preset "start", next, movement between "start" and "end" is stored (S59). As was described using FIG. 5A, movement between the start point and the end point for movie shooting is detected and this movement is stored. Specifically, the movement determination section 14 detects movement of the camera 10, and stores detection results in the shooting process conditions within the shooting parameter preliminary setting section 17*a*.

Next it is determined whether or not there is a preset "end" (S61). As was described using FIG. 5A, at the time of a rehearsal for movie shooting (at the time of preliminary shooting), the photographer performs a touch operation on an "end point" icon i22 for the end position of the movie shooting. In this step, therefore, determination is based on whether or not a touch operation of the icon i22 has been performed.

If the result of determination in step S61 is that there is a preset "end", a scene and parameters are stored in association with each other (S63). Here, the movement determination section 14 detects a position corresponding to the end point preset, and shooting parameters that have been set at this time are stored as preliminary shooting parameters 17*b*. With the example shown in FIG. 5A, focus position (for example 10 m), focal length corresponding to the border 44*a* (for example 300 mm), and exposure correction value (for example, −2 EV) for the main subject (the small bird here) are stored in association with the position at which the image for the direction D22 was acquired (refer to FIG. 8).

If the result of determination in step S53 is that no operation for shooting control has been performed, or if the result of determination in step S61 is that there is not a preset "end", or if storage of parameters etc. has been performed in step S63, it is next determined whether or not there is movie shooting commencement (S71). If the photographer operates the movie button within the operation section 15, movie shooting is commenced. In this step determination is based on operating state of the movie button. If the result of this determination is not commencement of movie shooting, processing returns to step S51.

On the other hand, if the result of determination in step S71 is movie shooting commencement, it is determined whether or not a preset condition is satisfied (S73). As has been described, preset conditions for start point or end point are stored in steps S57 and S63. In this step the condition determination section 11*d* performs determination based on whether or not there is conformity between information relating to start point position or end point within preset conditions, and shooting direction and/or shooting position of the camera 10.

If the result of determination in step S73 is that a preset condition is satisfied, control is performed with parameters that have been stored in association with that preset condition (S77). Here, control is performed in accordance with shooting parameters that were set at a shooting predetermined position (start point position or end point position).

If parameter control has been performed in step S77, or if the result of determination in step S73 is that a preset condition has not been satisfied, it is determined whether or not it is a process between positions where a preset condition is satisfied (S79). As was described using FIG. 5A and FIG. 6A, in a transition region between the start point and the end point, shooting parameters are changed smoothly, such that an image does not change abruptly. In this step, the condition determination section 11 determines whether or not current camera position is between the start point and the end point that was set in steps S57 and S63.

If the result of determination in step S79 is not in a process between preset conditions, parameter control is performed in accordance with an image that has been acquired (S81). Here, normal shooting parameter control is performed for an image that was acquired in the imaging section 12. Specifically, normal control is performed regardless of the preliminary shooting parameters 17*b* and the shooting process conditions 17*c*. For example, for focusing normal AF control is performed, and for exposure control normal AE control is performed.

On the other hand, if the result of determination in step S79 is a process between preset conditions, parameters are changed so as to achieve a smooth transition (S83). Here, as was described using FIG. 8, the parameter calculation section for each condition 11c calculates and controls shooting parameters that have been set respectively corresponding to start point and end point in such a manner the parameters transit smoothly in accordance with position between the start point and the end point.

If parameter control has been performed in step S81 or step S83, next movie storage is performed (S85). Here, image data output from the imaging section 12 is subjected to image processing such as compression for movie storage by the image processing section 13, and temporarily stored in the storage section 17.

Once movie storage has been performed, it is next determined whether or not shooting is finished (S87). After movie shooting commencement, if the photographer operates the movie button within the operation section 15 again, movie shooting is finished. In this step determination is based on operating state of the movie button. If the result of this determination is not finishing of movie shooting, processing returns to step S73 and movie shooting continues. Also, during this time, if a preset condition is met, then shooting control for the camera 10 is performed in accordance with parameters that were stored in step S77. Also, if there is a process between preset conditions parameters are changed so as to give a smooth transition. It should be noted that with this embodiment it is possible to continue imaging even beyond the end point unless the photographer has designated completion of movie shooting. However, this is not limiting and it is also possible to automatically complete a movie shooting if the end point position is reached.

If the result of determination in step S87 is completion, creation of an image file is performed (S89). Here, image data of a movie that was temporarily stored in the storage section 17 is made into a file, and this image file is stored in the image storage section 17d. Once the image file has been stored, processing returns to step S51.

Figure 10:
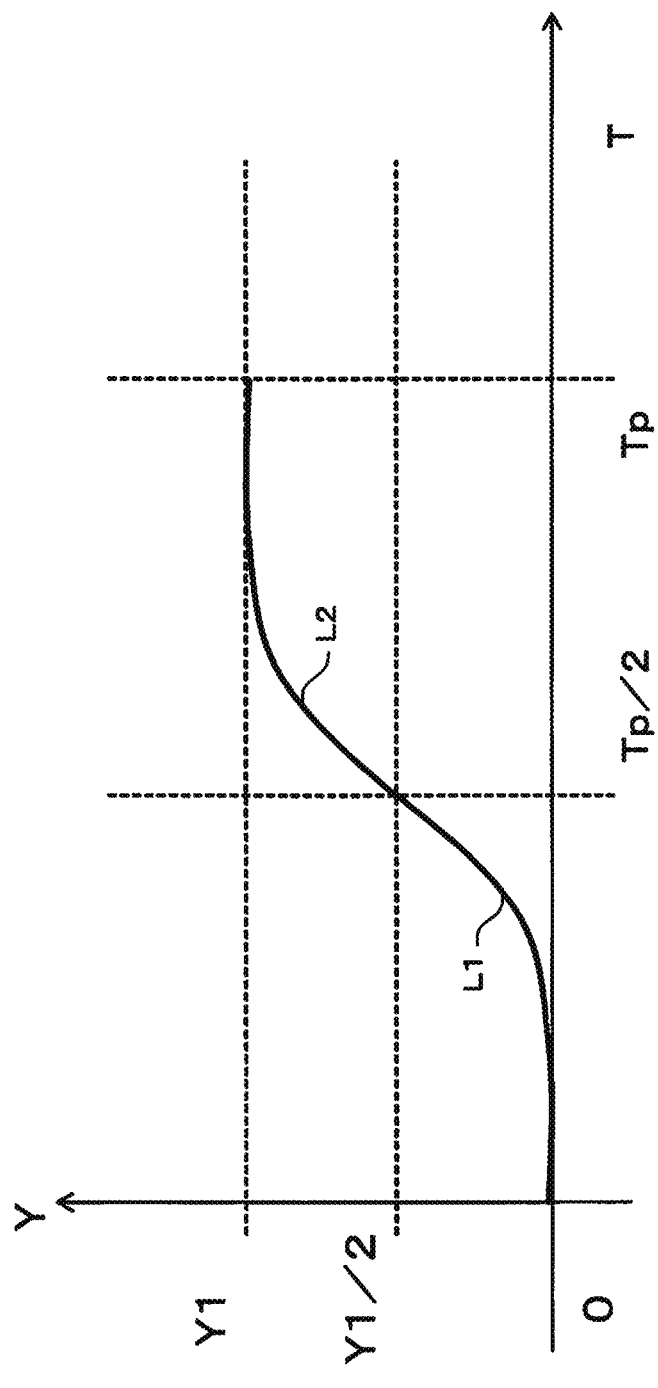
FIG. 10 is a graph showing change in shooting parameters, in the camera of the second embodiment of the present invention.

Next, one example of parameter calculation between the start point and the end point will be described using FIG. 10. This parameter is calculated by the parameter calculation section for each condition 11c. The horizontal axis on the graph shown in FIG. 10 is time, with time 0 corresponding to start point position where panning shooting is commenced, and time Tp corresponding to end point position where panning shooting is finished. The vertical axis corresponds to a value of a shooting parameter that has been normalized, such as focus position, focal length, exposure correction value etc., with Y1 corresponding to a value at the endpoint position (time Tp), Y1/2 corresponding to a value at an intermediate position (time Tp/2), and 0 corresponding to a value at the start point position (time 0). In FIG. 10, change in parameter is approximated using an asymptotic curve.

The parameter is represented by curve L1 from time 0 to time Tp/2, and curve L1 can be calculated using equation (1) below.

$$Y=(Y1/2)\times(t/(Tp/2))^2 \quad (1)$$

Also, the parameter is represented by curve L to from time Tp/2 to time Tp, and the curved L2 can be calculated using equation (2) below.

$$Y=Y1-((Y1/2)\times((t-Tp)/(Tp/2))^2) \quad (2)$$

It should be noted that the equations (1) and (2) above calculate parameters using time after commencing movement from the start point, but this is not limiting and parameters may also be calculated using position of the camera 10 (orientation towards the subject etc.) etc. Also, although the above equations (1) and (2) are approximated using quadratic functions, this is not limiting and various computing equations may be used.

In this way, with the second embodiment of the present invention, before actual shooting of a movie shooting parameters are previously stored in association with start point position and end point position for movie shooting (S57 in FIG. 9A). Then, at the time of actual shooting, if the camera reaches the start point position or the end point control is performed in accordance with the shooting parameters that have been stored (S77 in FIG. 9B). With the example shown in FIG. 5A to FIG. 8, at the start point shooting commences with Mount Fuji 41 as a main subject, and shooting ends at the end point with the small bird 44 as a main subject. This means that it is possible to easily perform shooting in line with the photographer's intention at the start point and end point.

A subject between the start point and the end point is considerable information that indicates a positional relationship between these two subject matters (start point and endpoint). However, up to what point a subject that is between the start point and the end point is considered differs in accordance with circumstances. If there is an image in which a subject cannot be discerned, it may be omitted, or information amount may be dropped, but in a case where it is desired to emphasize how beautiful a situation there is, images maybe shown slowly by taking time with the image quality enhanced. With the example shown in FIG. 5A and FIG. 6A mount Fuji and a small bird are the main subjects, and it is desirable to make transition images between these two main subjects of equal importance to the main subjects, so as to achieve smooth and natural transitions.

Also, with this embodiment, between the movie shooting start point and end point is made a transition region, and at the time of preliminary shooting, shooting parameters and camera movement in this transitional region are stored (S59 in FIG. 9A). Then, at the time of video shooting this transition region parameters are changed so as to achieve smooth transition (S83 in FIG. 9B). This makes it possible to prevent control with parameters that have been set suddenly between the start point and the end point, and it is possible to make images change smoothly.

In this transition region, detection of camera movement position may be processed in association with output values of attitude sensors, for example, an acceleration sensor, angular acceleration sensor and geomagnetism sensor etc. This is not limiting, however, and processing may be switched in accordance with transitions of acquired images, or may be switched simply as time passes. By taking into an account the fact that, generally speaking, a photographer performs the same camera work at the time of rehearsal and actual shooting, it is possible to obtain appreciable effects even with control of switching processing with time change from the start point. Also, in addition to simply time change, there may also be control using supplementary information such as images and acceleration.

It should be noted that with this embodiment, differing from the first embodiment, at the time of preliminary shooting rehearsal images are not displayed in live view display. However, by executing steps S11 to S15 in FIG. 4A during the preliminary shooting it is possible to display rehearsal images at the time of live view display. Appropriate combinations of these may also be used.

Also, with this embodiment, differing from the first embodiment, convergent point presets and trigger preset are not performed at the time of preliminary shooting. However, the processing of steps S23 to S29 in FIG. 4A may be executed at the time of preliminary shooting. Conversely presetting of the start point and end point of the second embodiment may be performed in the first embodiment also.

Also, similarly to the first embodiment, the parameters are not limited to shooting parameters for the imaging section, such as focus (focus position), angle of view (focal length) exposure control (aperture value, electronic shutter speed, ISO sensitivity, exposure correction value) etc., and may be parameters for image processing, such as white balance, art filter, special image processing including special light observation that simplifies observation etc. Obviously similar effects to these shooting parameter changes can also be achieved by substituting image processing.

Also, as parameters that are stored at the time of preset, in this embodiment a plurality of parameters are set, but this is not limiting and only one parameter may be stored. Also, as a parameter setting method, various methods are possible, such as a method that uses a touch operation on a screen of the display section 18, and setting using operation members such as an operation button, operation dial, distance ring, zoom ring etc.

Also, with this embodiment, scenes and parameters at start point position and end point have been associated with each other, but scenes in this case may be identical or similar images regardless of shooting direction or position. For example, in a case where there are various subjects even for the same scene, shooting may be performed so as to switch depiction of those subjects in accordance with time conditions or conditions corresponding to a subject that has moved onto the screen.

As has been described above, in each of the embodiments of the present invention, before continuous shooting made up of a series of a plurality of frames, corresponding preliminary parameter setting is performed at a position of at least one shooting predetermined position of a plurality of frames (refer, for example, to S25 in FIG. 4A, and S57 and S63 in FIG. 9A). Parameters at the time of shooting a plurality of frames are also calculated in accordance with parameters that have been set (refer, for example, to S29 in FIG. 4A and S59 in FIG. 9A). Shooting is also performed by applying the parameters that have been calculated (refer, for example, to S37 in FIG. 4B, and S77 and S83 in FIG. 9B).

Also, the shooting device of each of the embodiments of the present invention comprises a parameter preliminary setting section, that, before continuous shooting made up of a series of a plurality of frames, performs corresponding preliminary parameter setting at start point and end point shooting predetermined positions of the plurality of frames, a parameter calculation section for each condition that calculates parameters of each frame at the time of shooting the plurality of frames in accordance with the parameters that have been set in the parameter preliminary setting section, and a shooting control section that performs shooting control for each frame between the start point and the end point by applying the parameters that have been calculated.

Also, the shooting device of each of the embodiments of the present invention comprises a parameter preliminary setting section, that, before continuous shooting made up of a series of the plurality of frames, in a camera having a rehearsal mode for performing preliminary parameter setting while performing shooting corresponding to the plurality of frames, performs the preliminary parameter setting, a parameter calculation section for each condition that calculates parameters of each frame at the time of shooting the plurality of frames in accordance with the parameters that have been set in the parameter preliminary setting section, and a shooting control section that performs shooting control for continuous shooting of a performance made up of a series of a plurality of frames by applying the parameters that have been calculated.

Also, with each of the embodiments of the present invention, shooting parameters for specified shooting predetermined positions of a movie are acquired as parameter preliminary setting data (refer, for example, to S25 in FIG. 4A, and S57 and S56 in FIG. 9A). Also, parameters at the time of shooting are calculated for at least one of shooting positions for specified frames of a movie based on parameter preliminary setting data, and shooting control is performed based on parameters of the time of shooting that have been calculated (refer, for example, to S37 in FIG. 4B and S77 and S83 in FIG. 9B). It should be noted that in each of the embodiments parameter preliminary setting data is acquired within the camera, but parameter preliminary setting data that has been acquired outside the camera may be acquired and set by a preliminary setting results acquisition communication circuit. A parameter calculating circuit that calculates parameters may also be provided, and parameters calculated using the circuit.

In this way, in each of the embodiments of the present invention preliminary parameter setting is performed before movie shooting, and control is performed using these preliminary parameters at the time of movie shooting which means that even in a case where movie shooting is performed while moving shooting direction at the time of movie shooting it is possible to perform change to parameters smoothly.

In each of the embodiments of the present invention, setting of parameters is not limited to causing change to shooting parameters, and besides shooting parameters various shooting modes may also be changed, and there may also be combinations of shooting parameters and shooting modes. For example, there may be a change to manual mode during shooting even if aperture priority is initially set. In this case, it is possible to render various effects by user operation during rehearsal. There may also be a transfer to a mode that combines a plurality of images, such as a super resolution mode where shooting is performed while staggering pixels, and combined, HDR mode where images of a plurality of exposures are combined, or focus stacking mode that combines a plurality of images for different focus positions. An image combination mode that has been transferred to may also be released. It may also be possible to change shooting frame rate, to be able to handle slow-motion, and fast-forward playback.

It should be noted that with each of the embodiments of the present invention, at the time of movie shooting description has been giving using an example of panning shooting, namely shooting by moving a camera in a horizontal direction. However movement direction of the camera is not limited to the horizontal direction and may be another directions, such as the vertical direction (tilt direction), or the camera may be moved to as to be inclined or swung. It also goes without saying that instead of panning, scanning etc. is also possible, including horizontal and vertical scanning that is used in surveying equipment. The present invention can also be used in devices such as an endoscope. With an endoscope a tip end is inserted into a body, and it is possible to perform inspection and diagnosis by adjusting angle of bend and bending direction in accordance with insertion position at this time. In particular, making change in shooting parameters constant for specified positions of a given organ or inspection target makes it easier to perform comparison of inspection results etc. With the embodiments of the present invention, what have been called presets or rehearsals correspond to prior shooting (examination) when operating an endoscope or the like, and preliminary parameters maybe acquired in accordance with results at the time of this shooting.

Also, with each of the embodiments of the present invention, some or all of the peripheral circuits of the CPU within the control section 11 may be implemented using a CPU (Central Processing Unit) and program code, may be implemented by circuits that are executed by program code such as a DSP (Digital Signal Processor), may use a hardware structure such as gate circuits that are generated based on a programming language described using Verilog, or may be executed using hardware circuits. Also, some functions of the CPU may be implemented by circuits that are executed by program code such as a DSP, may use a hardware structure such as gate circuits that are generated based on a programming language described using Verilog, or may be executed using hardware circuits.

Also, when describing each of the embodiments of the present invention, parts that have been described as a "section" of "unit" may be constructed of dedicated circuits or by a combination of a plurality of general purpose circuits, and as required may be constructed of a combination of sequencers such as a microcomputer that performs operations in accordance with software that has been programmed in advance, a processor such as a CPU, or an FPGA (Field-Programmable Gate Array) etc. Also, some or all of this control can be designed such that they are handle by external devices, and in this case there would be interaction with wired or wireless communication circuits. Communication may be performed using Bluetooth or WiFi, or using telephone circuits, or may be performed using USB etc. Dedicated circuits, general-purpose circuits and control sections may be formed integrally as an ASIC. Moving parts etc. are constructed using various actuators, and, as required, connection mechanisms for movement, and the actuators are moved using driver circuits. These driver circuits may also be controlled using a microcomputer or ASIC in accordance with specified programs. This type of control may be performed using information that is output by various sensors and peripheral circuits for the sensors, and detailed correction and adjustment may also be performed.

Also, each of the embodiments of the present invention have been described solely for a case where the present invention has been applied to a standalone camera. This is not limiting, however, and various device sharing may be performed. For example, in a case where rehearsal is performed at a specified location, and actual shooting is performed at another type of location, the device for the rehearsal and the shooting device may be separate. Also, information from sensors that determine results of rehearsal is transmitted, and this information is subjected to determination, calculation operations, and storage on a network, those results are transmitted to actual shooting equipment, and shooting operations that are the same as at the time of practice can be performed. Also, a person who performs a shooting rehearsal may be a different person from the person who actually performs shooting. There may also be a common situation regarding a relationship between a person in charge, such as a director, and the director's staff.

Also, with each of the embodiments of the present invention, an instrument for taking pictures has been described using a digital camera, but as a camera it is also possible to use a digital single lens reflex camera or a mirrorless camera or compact digital camera, or a camera for movie use such as a video camera, and further to have a camera that is incorporated into a mobile phone, a smartphone, a mobile information terminal, personal computer (PC), tablet type computer, game console etc., a medical camera, or a camera for a scientific instrument such as a microscope, a camera for mounting on a vehicle, a surveillance camera or inspection camera for a factory or the like, etc. In any event, it is possible to adopt the present invention as long as a device is capable of shooting movies or images that are a series of pictures etc.

Also, regarding sections that are operated by a person holding the camera, camera mobile equipment such as a drone or stage etc. may also be operated and if the driver of this mobile equipment is a person the same effects as when performed by a person can be obtained. Further, the present invention can be applied effectively to a case where artificial intelligence learns and performs actions, operations and control, performed once by a person.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A shooting device, comprising:
an operation member for setting parameters, and
a controller which (1) performs,
before continuous shooting comprised of a series of a plurality of frames, preliminary parameter setting as a result of operation of the operation member for at least one point of shooting predetermined positions of the plurality of frames, (2) calculates, for each condition, parameters at the time of shooting the plurality of frames in accordance with the parameters that have been set in the parameter preliminary setting section, (3) determines whether or not the shooting predetermined positions is reached, and (4) performs control based on the parameters that have been set when it has been determined that the shooting predetermined positions has been reached.

2. The shooting device of claim 1, further comprising:
a shooting control circuit that performs shooting adopting the parameters that have been calculated.

3. The shooting device of claim 1, wherein:
the controller performs preliminary parameter setting at convergent point preset positions, and calculates,
for each condition, for a trigger preset position that is closer to a movement commencement position than the convergent point preset position, parameters so as to approach parameters of convergent point preset positions.

4. The shooting device of claim 1, wherein:
the controller performs preliminary parameter setting at a plurality of shooting positions, and calculates,
for each condition, corresponding parameter change between the plurality of shooting positions.

5. The shooting device of claim 4, wherein:
the controller comprises a shooting process setting section,
the parameter preliminary setting section performs preliminary parameter setting at shooting positions of a start point and an end point, and
the shooting process setting section sets shooting operations for a process from the start point to the end point.

6. The shooting device of claim 1, further comprising:
an image sensor for photoelectrically converting a subject image and outputting image data, and
a display that, before continuous shooting made up of a series of a plurality of frames, displays a live view image based on the image data,
and wherein
the display displays live view images that have been controlled by parameters that have been set by the controller.

7. The shooting device of claim 1, wherein:
at least one among focus position, focal length and exposure control value is stored in association with the shooting predetermined position.

8. A shooting method, comprising:
before continuous shooting comprised of a series of a plurality of frames, carrying out suitable preliminary parameter setting for at least one point of shooting predetermined positions of the plurality of frames;
calculating respective parameters at the time of shooting the plurality of frames in accordance with results of the parameter preliminary setting; and
determining conditions, and carrying out shooting adopting the parameters that have been calculated, wherein:
whether or not the shooting predetermined positions is reached is determined, and
when it has been determined that the shooting predetermined positions has been reached, control is performed based on the parameters that have been set.

9. The shooting method of claim 8, wherein:
preliminary parameter setting is performed for a convergent point preset position that has been designated by a photographer, and
for a trigger preset position that is closer to a movement commencement position than the convergent preset position, parameters are calculated so as to approach parameters of convergent point preset positions.

10. The shooting method of claim 8, wherein:
preliminary parameter setting is performed for a plurality of shooting positions, and
corresponding parameter change between the plurality of shooting positions is calculated.

11. The shooting method of claim 10, wherein:
setting of preliminary parameters is performed for positions of a start point and an end point within the plurality of shooting predetermined positions, and
shooting operations are set for a process from the start point to the end point.

12. The shooting method of claim 8, wherein:
a subject image is photoelectrically converted, and image data output, and
before continuous shooting made up of a series of a plurality of frames, a live view image is displayed on a display, and this live view images is a live view image that has been controlled with parameters that have been set.

13. The shooting method of claim 8, wherein:
at the time of the preliminary parameter setting, at least one among focus position, focal length and exposure control value is stored in association with the shooting predetermined position.

14. A shooting control method, comprising:
acquiring shooting parameters for shooting predetermined positions of specified frames of a movie as parameter preliminary setting data; and
calculating parameters at the time of shooting, for at least one shooting position of specified frames of the movie, based on the parameter preliminary setting data, wherein:
whether or not the shooting predetermined position is reached is determined, and
when it has been determined that the shooting predetermined position has been reached, control of a shooting device is performed based on the parameters at the time of shooting that have been set.

15. The shooting control method of claim 14, wherein:
as the shooting predetermined positions, preliminary parameter setting data is acquired for a convergent point preset position that has been designated by the photographer, and
for a trigger preset position that is closer to a movement commencement position than the convergent point preset position, parameters are calculated so as to approach parameters of convergent point preset positions.

16. The shooting control method of claim 14, wherein:
preliminary parameter setting data is acquired for a plurality of shooting positions, and
corresponding parameter change at the time of shooting is calculated between the plurality of shooting positions.

17. The shooting control method of claim 16, wherein:
preliminary parameter setting data is acquired for positions of a start point and an end point within the plurality of shooting predetermined positions, and
shooting operations are set for a process from the start point to the end point.

* * * * *